United States Patent
Li et al.

(10) Patent No.: US 12,126,405 B2
(45) Date of Patent: Oct. 22, 2024

(54) CHANNEL STATE INFORMATION FEEDBACK COMPRESSION

(71) Applicant: QUALCOMM Incorporated, San Diego, CA (US)

(72) Inventors: Qiaoyu Li, Beijing (CN); Chenxi Hao, Beijing (CN); Liangming Wu, Beijing (CN); Joseph Binamira Soriaga, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 581 days.

(21) Appl. No.: 17/309,469

(22) PCT Filed: Dec. 12, 2019

(86) PCT No.: PCT/CN2019/124752
§ 371 (c)(1),
(2) Date: May 28, 2021

(87) PCT Pub. No.: WO2020/119746
PCT Pub. Date: Jun. 18, 2020

(65) Prior Publication Data
US 2021/0384945 A1 Dec. 9, 2021

(30) Foreign Application Priority Data
Dec. 14, 2018 (WO) ................ PCT/CN2018/121339

(51) Int. Cl.
*H04B 7/0417* (2017.01)
*H04B 7/0408* (2017.01)
(Continued)

(52) U.S. Cl.
CPC ......... *H04B 7/0417* (2013.01); *H04B 7/0408* (2013.01); *H04B 7/0456* (2013.01);
(Continued)

(58) Field of Classification Search
None
See application file for complete search history.

(56) References Cited

U.S. PATENT DOCUMENTS

2016/0072562 A1   3/2016   Onggosanusi et al.
2016/0142117 A1   5/2016   Rahman et al.
(Continued)

FOREIGN PATENT DOCUMENTS

CN   103004160 A   3/2013
CN   106685496 A   5/2017
(Continued)

OTHER PUBLICATIONS

International Search Report and Written Opinion—PCT/CN2018/121339—ISA/EPO—Sep. 16, 2019.
(Continued)

*Primary Examiner* — Jay L Vogel
(74) *Attorney, Agent, or Firm* — QUALCOMM Incorporated

(57) ABSTRACT

Various aspects of the present disclosure generally relate to wireless communication. In some aspects, a user equipment (UE) may identify, based at least in part on a codebook, a set of beams to feedback in a channel state information (CSI) feedback communication, and may identify one or more beam groups associated with the set of beams. The UE may select respective one or more transfer domain bases, from a plurality of transfer domain bases, for each beam group of the one or more beam groups, and may determine a plurality of values, for a plurality of bits, that represent beam group identification information associated with the one or more
(Continued)

beam groups and transfer domain basis selection information associated with the respective one or more transfer domain bases. The may transmit, to a base station (BS), the plurality of bits in the CSI feedback communication. Numerous other aspects are provided.

30 Claims, 12 Drawing Sheets

(51) Int. Cl.
    *H04B 7/0456*     (2017.01)
    *H04B 7/06*     (2006.01)
    *H04L 1/00*     (2006.01)

(52) U.S. Cl.
    CPC ......... *H04B 7/0478* (2013.01); *H04B 7/0617* (2013.01); *H04B 7/0626* (2013.01); *H04B 7/0695* (2013.01); *H04L 1/0026* (2013.01)

(56) References Cited

U.S. PATENT DOCUMENTS

| | | | |
|---|---|---|---|
| 2017/0150480 A1* | 5/2017 | Kim | H04L 67/12 |
| 2017/0302353 A1 | 10/2017 | Rahman et al. | |
| 2018/0034519 A1 | 2/2018 | Rahman et al. | |
| 2018/0124766 A1 | 5/2018 | Nagaraja et al. | |
| 2018/0138950 A1 | 5/2018 | Rahman et al. | |
| 2018/0145737 A1* | 5/2018 | Rahman | H04B 7/0479 |
| 2018/0220403 A1 | 8/2018 | John Wilson et al. | |
| 2018/0234959 A1 | 8/2018 | Ahn et al. | |
| 2018/0309490 A1 | 10/2018 | Rahman et al. | |
| 2019/0199417 A1* | 6/2019 | Noh | H04L 27/26 |
| 2019/0341979 A1* | 11/2019 | Gao | H04W 88/06 |
| 2020/0119796 A1* | 4/2020 | Zhang | H04B 7/0456 |

FOREIGN PATENT DOCUMENTS

| | | |
|---|---|---|
| CN | 106685598 A | 5/2017 |
| CN | 108111199 A | 6/2018 |
| CN | 108155922 A | 6/2018 |
| CN | 108809380 A | 11/2018 |
| WO | 2017197237 A1 | 11/2017 |
| WO | 2018097600 A1 | 5/2018 |
| WO | 2018106017 A1 | 6/2018 |

OTHER PUBLICATIONS

International Search Report and Written Opinion—PCT/CN2019/124752—ISA/EPO—Mar. 6, 2020.
RadioCommunication Study Groups: "Detailed Specifications of the Terrestrial Radio Interfaces of International Mobile Telecommunications—Advanced (IMT-Advanced)", Preliminary Draft Revision of Recommendation ITU-R M.2012-3, Oct. 16, 2018 (Oct. 16, 2018), 12 Pages, the whole document.
CATT: "Considerations on Type II CSI Enhancement", 3GPP TSG RAN WG1 Meeting #95, R1-1812634, Spokane, USA, Nov. 12, 2018-Nov. 16, 2018, 7 Pages, Nov. 3, 2018, section 2.
Nokia, et al., "CSI Feedback Overhead Reduction for MU-MIMO Enhancements", R1-1813488, 3GPP TSG RAN WG1 Meeting #95, Spokane, USA, Nov. 12-16, 2018, 10 Pages, Nov. 3, 2018, section 2.
Samsung: "Summary of CSI Enhancement for MU-MIMO Support", 3GPP TSG RAN WG1 Meeting #95, R1-1813002, 3rd Generation Partnership Project, Mobile Competence Centre, 650, Route Des Lucioles, F-06921 Sophia-Antipolis Cedex, France, vol. RAN WG1, Nov. 12, 2018-Nov. 16, 2018, Nov. 15, 2018, 9 Pages, XP051494308, Section 2.1.
Supplementary European Search Report—EP19897365—Search Authority—the Hague—Jul. 19, 2022.

* cited by examiner

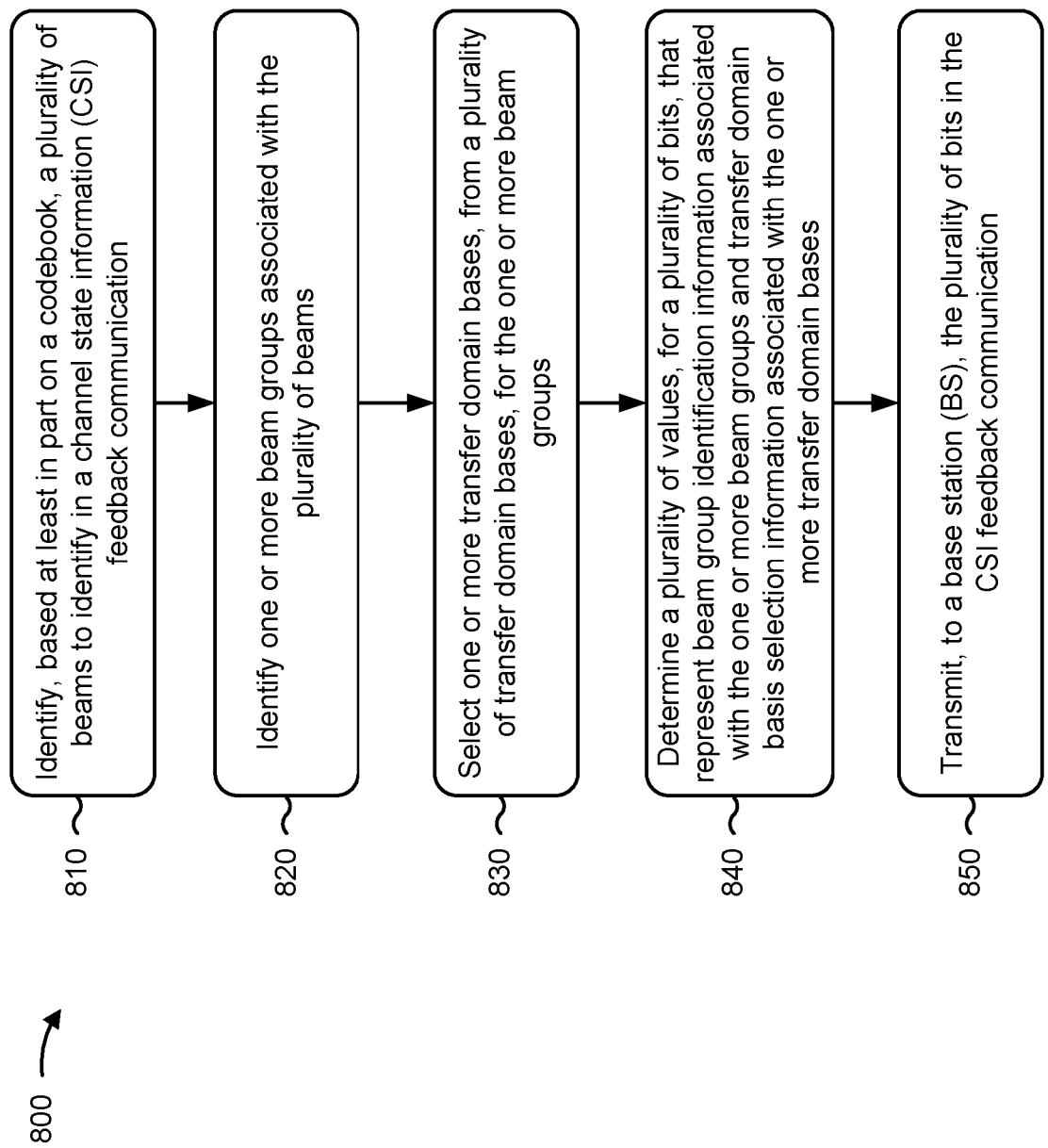

CHANNEL STATE INFORMATION FEEDBACK COMPRESSION

CROSS-REFERENCE TO RELATED APPLICATIONS

This application is a 371 national stage of PCT Application No. PCT/CN2019/124752 filed on Dec. 12, 2019, entitled "CHANNEL STATE INFORMATION FEEDBACK COMPRESSION," which claims priority to International Patent Application No. PCT/CN2018/121339, filed on Dec. 14, 2018, entitled "CHANNEL STATE INFORMATION FEEDBACK COMPRESSION," which are hereby expressly incorporated by reference herein.

FIELD OF THE DISCLOSURE

Aspects of the present disclosure generally relate to wireless communication, and to techniques and apparatuses for channel state information feedback compression.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying, based at least in part on a codebook, a set of beams to feedback in a channel state information (CSI) feedback communication. The method may include identifying one or more beam groups associated with the set of beams. The method may include selecting respective one or more transfer domain bases, from a plurality of transfer domain bases, for each beam group of the one or more beam groups. The method may include determining a plurality of values, for a plurality of bits, that represent beam group identification information associated with the one or more beam groups and transfer domain basis selection information associated with the respective one or more transfer domain bases for each beam group of the one or more beam groups. The method may include transmitting, to a base station (BS), the plurality of bits in the CSI feedback communication.

In some aspects, a UE for wireless communication may include memory and one or more processors operatively coupled to the memory. The memory and the one or more processors may be configured to identify, based at least in part on a codebook, a set of beams to feedback in a channel state information (CSI) feedback communication. The memory and the one or more processors may be configured to identify one or more beam groups associated with the set of beams. The memory and the one or more processors may be configured to select respective one or more transfer domain bases, from a plurality of transfer domain bases, for each beam group of the one or more beam groups. The memory and the one or more processors may be configured to determine a plurality of values, for a plurality of bits, that represent beam group identification information associated with the one or more beam groups and transfer domain basis selection information associated with the respective one or more transfer domain bases for each beam group of the one or more beam groups. The memory and the one or more processors may be configured to transmit, to a base station (BS), the plurality of bits in the CSI feedback communication.

In some aspects, a non-transitory computer-readable medium may store one or more instructions for wireless communication. The one or more instructions, when executed by one or more processors of a UE, may cause the one or more processors to identify, based at least in part on a codebook, a set of beams to feedback in a channel state information (CSI) feedback communication. The one or more instructions, when executed by one or more processors of the UE, may cause the one or more processors to identify one or more beam groups associated with the set of beams. The one or more instructions, when executed by one or more processors of the UE, may cause the one or more processors to select respective one or more transfer domain bases, from a plurality of transfer domain bases, for each beam group of the one or more beam groups. The one or more instructions, when executed by one or more processors of the UE, may cause the one or more processors to determine a plurality of values, for a plurality of bits, that represent beam group identification information associated with the one or more beam groups and transfer domain basis selection information associated with the respective one or more transfer domain bases for each beam group of the one or more beam groups. The one or more instructions, when executed by one or more processors of the UE, may cause the one or more processors to transmit, to a base station (BS), the plurality of bits in the CSI feedback communication.

In some aspects, an apparatus for wireless communication may include means for identifying, based at least in part on a codebook, a set of beams to feedback in a channel state information (CSI) feedback communication. The apparatus may include means for identifying one or more beam groups associated with the set of beams. The apparatus may include means for selecting respective one or more transfer domain bases, from a plurality of transfer domain bases, for each beam group of the one or more beam groups. The apparatus may include means for determining a plurality of values, for a plurality of bits, that represent beam group identification information associated with the one or more beam groups and transfer domain basis selection information associated with the respective one or more transfer domain bases for each beam group of the one or more beam groups. The apparatus may include means for transmitting, to a base station (BS), the plurality of bits in the CSI feedback communication.

In some aspects, a method of wireless communication, performed by a base station (BS), may include receiving, from a user equipment (UE), a channel state information (CSI) feedback communication. The method may include determining, based at least in part on a set of beams identified in the CSI feedback communication, and a plurality of values for a plurality of bits included in the CSI feedback communication, beam group identification information associated with one or more beam groups and transfer domain basis selection information associated with respective one or more transfer domain bases selected for each beam group of the one or more beam groups. The method may include performing downlink communications, based at least in part on the set of beams, beam group identification information, and the transfer domain basis selection information.

In some aspects, a base station (BS) for wireless communication may include memory and one or more processors operatively coupled to the memory. The memory and the one or more processors may be configured to receive, from a user equipment (UE), a channel state information (CSI) feedback communication. The memory and the one or more processors may be configured to determine, based at least in part on a set of beams identified in the CSI feedback communication, and a plurality of values for a plurality of bits included in the CSI feedback communication, beam group identification information associated with one or more beam groups and transfer domain basis selection information associated with respective one or more transfer domain bases selected for each beam group of the one or more beam groups. The memory and the one or more processors may be configured to perform downlink communications, based at least in part on the set of beams, beam group identification information, and the transfer domain basis selection information.

In some aspects, a non-transitory computer-readable medium may store one or more instructions for wireless communication. The one or more instructions, when executed by one or more processors of a base station (BS), may cause the one or more processors to receive, from a user equipment (UE), a channel state information (CSI) feedback communication. The one or more instructions, when executed by one or more processors of the BS, may cause the one or more processors to determine, based at least in part on a set of beams identified in the CSI feedback communication, and a plurality of values for a plurality of bits included in the CSI feedback communication, beam group identification information associated with one or more beam groups and transfer domain basis selection information associated with respective one or more transfer domain bases selected for each beam group of the one or more beam groups. The one or more instructions, when executed by one or more processors of the BS, may cause the one or more processors to perform downlink communications, based at least in part on the set of beams, beam group identification information, and the transfer domain basis selection information.

In some aspects, an apparatus for wireless communication may include means for receiving, from a user equipment (UE), a channel state information (CSI) feedback communication. The apparatus may include means for determining, based at least in part on a set of beams identified in the CSI feedback communication, and a plurality of values for a plurality of bits included in the CSI feedback communication, beam group identification information associated with one or more beam groups and transfer domain basis selection information associated with respective one or more transfer domain bases selected for each beam group of the one or more beam groups. The apparatus may include means for performing downlink communications, based at least in part on the set of beams, beam group identification information, and the transfer domain basis selection information.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
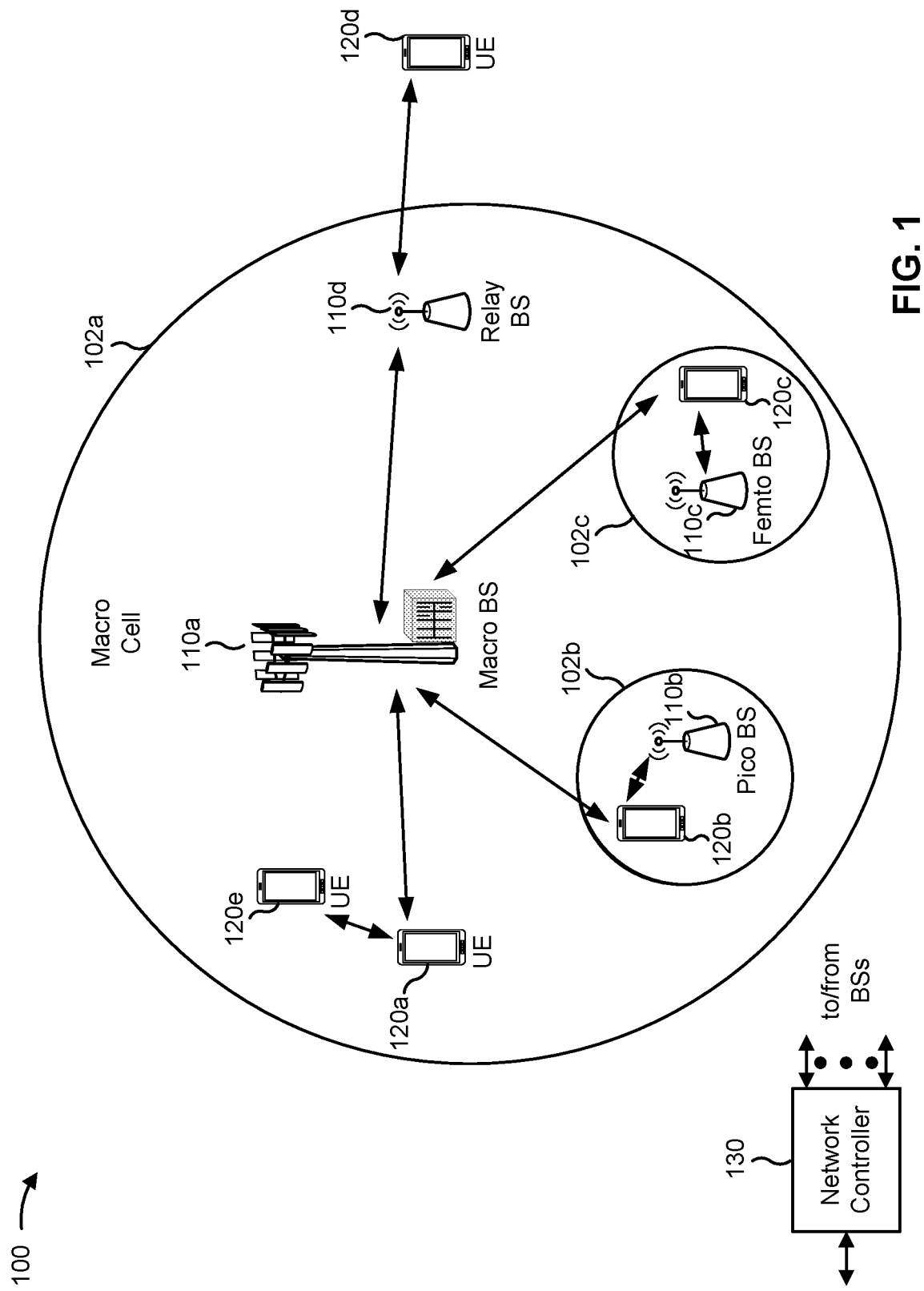
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what was described with regard to FIG. 1.

Figure 2:
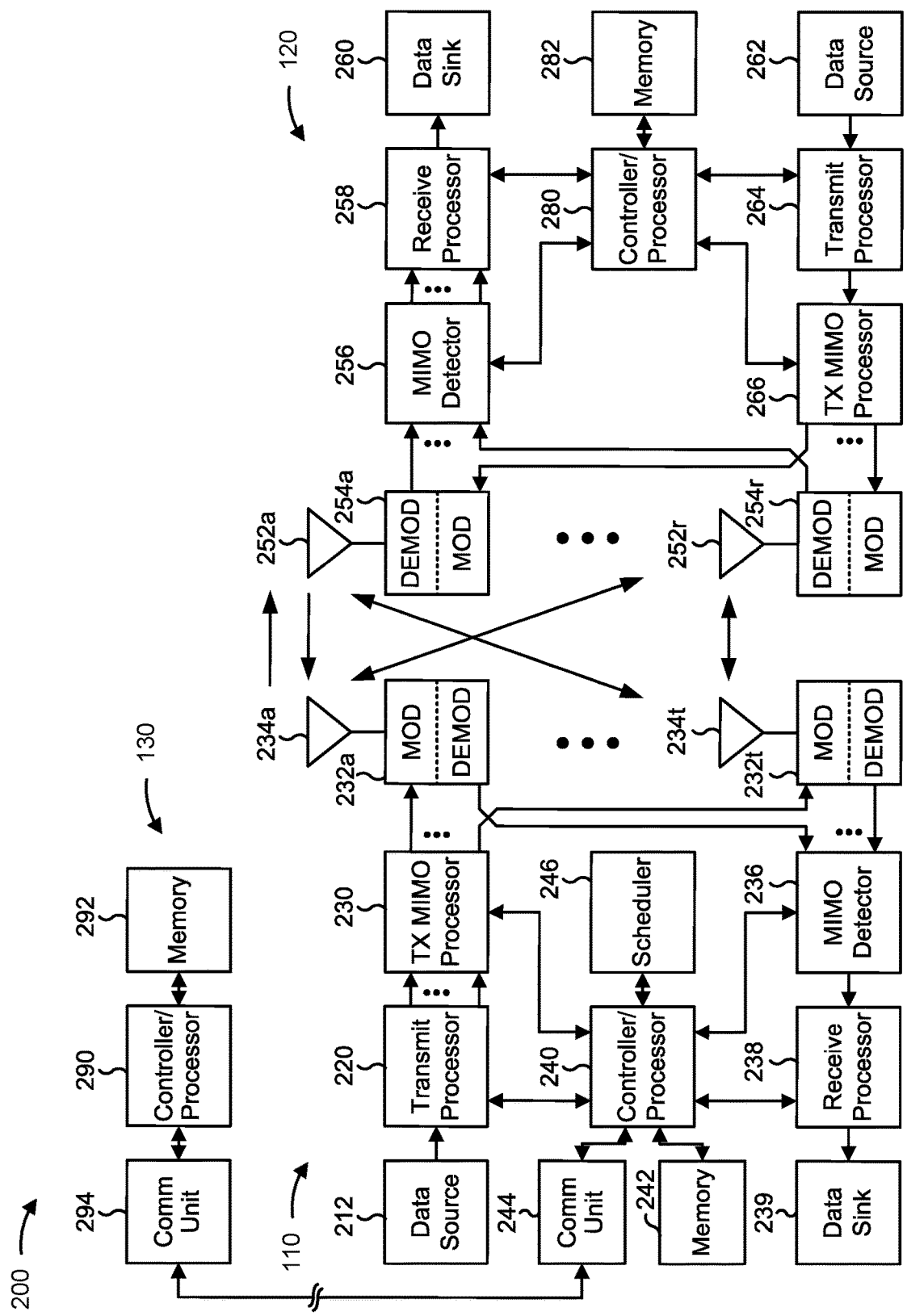
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with channel state information feedback compression, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for identifying, based at least in part on a codebook, a set of beams to identify in a channel state information (CSI) feedback communication, means for identifying one or more beam groups associated with the set of beams, means for selecting respective one or more transfer domain bases, from a plurality of transfer domain bases, for each beam group of the one or more beam groups, means for determining a plurality of values, for a plurality of bits, that represent beam group identification information associated with the one or more beam groups and transfer domain basis selection information associated with the respective one or more transfer domain bases for the each beam groups of the one or more beam groups, means for transmitting, to a base station (BS), the plurality of bits in the CSI feedback communication, and/or the like. In some aspects, such means may include one or more components of UE 120 described in connection with FIG. 2.

In some aspects, base station 110 may include means for receiving, from a user equipment (UE), a channel state information (CSI) feedback communication, means for determining, based at least in part on a set of beams identified in the CSI feedback communication, and a plurality of values for a plurality of bits included in the CSI feedback communication, beam group identification information associated with one or more beam groups and transfer domain basis selection information associated with respective one or more transfer domain bases selected for each beam group of the one or more beam groups, means for performing downlink communications, based at least in part on the set of beams, beam group identification information, and the transfer domain basis selection information, and/or the like. In some aspects, such means may include one or more components of base station 110 described in connection with FIG. 2.

As indicated above, FIG. 2 is provided merely as an example. Other examples may differ from what was described with regard to FIG. 2.

Figure 3A:
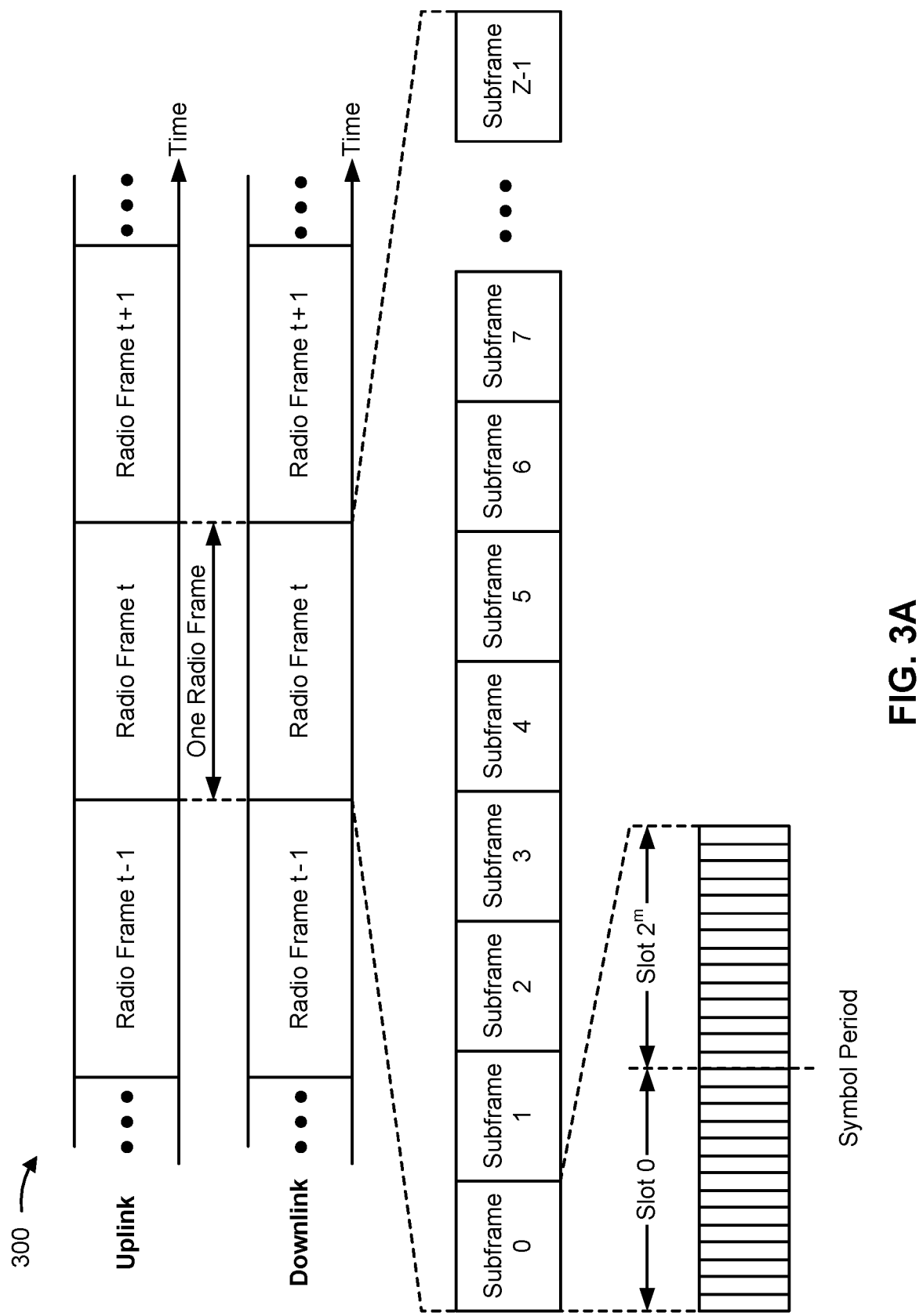
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
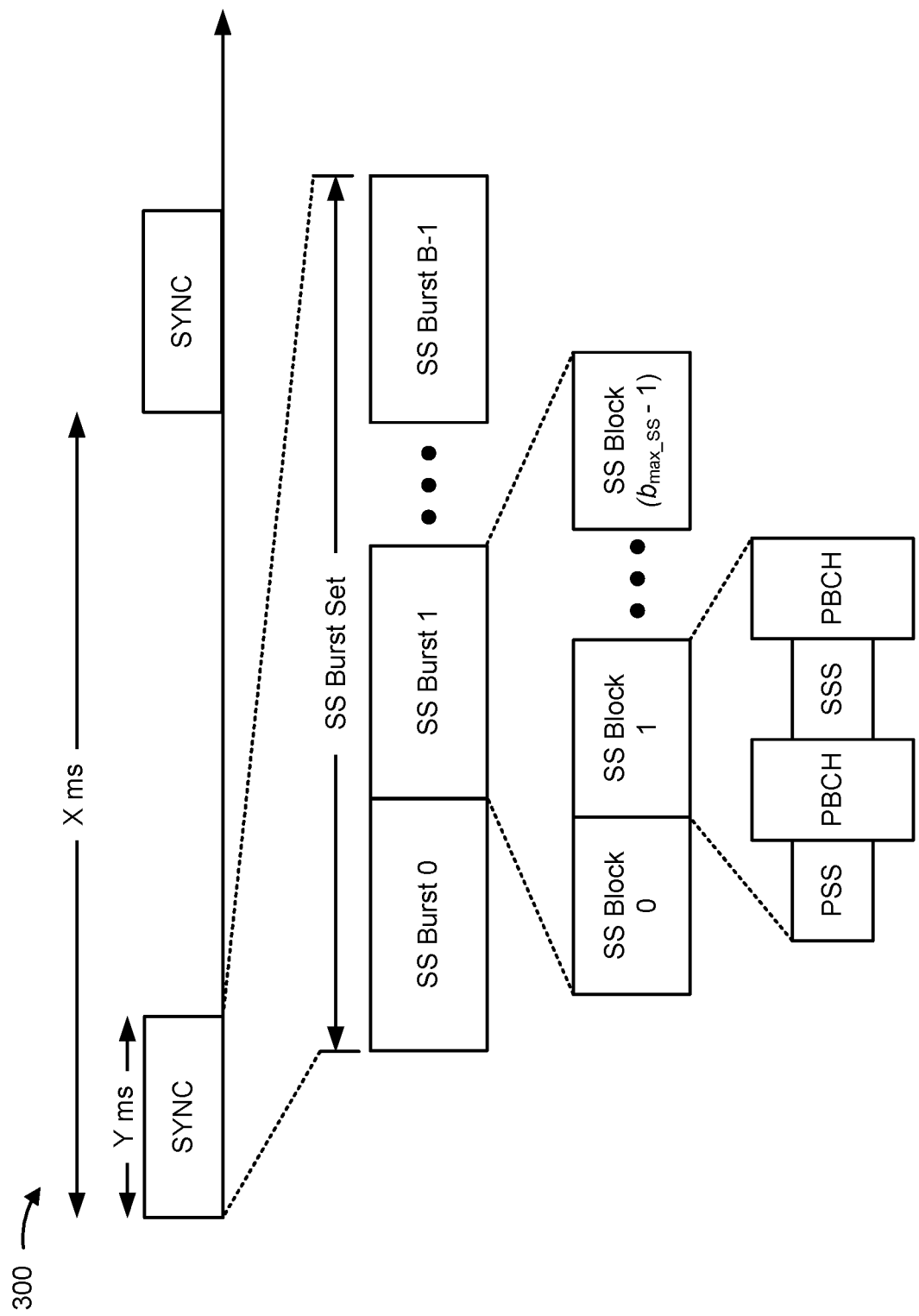
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what was described with regard to FIGS. 3A and 3B.

Figure 4:
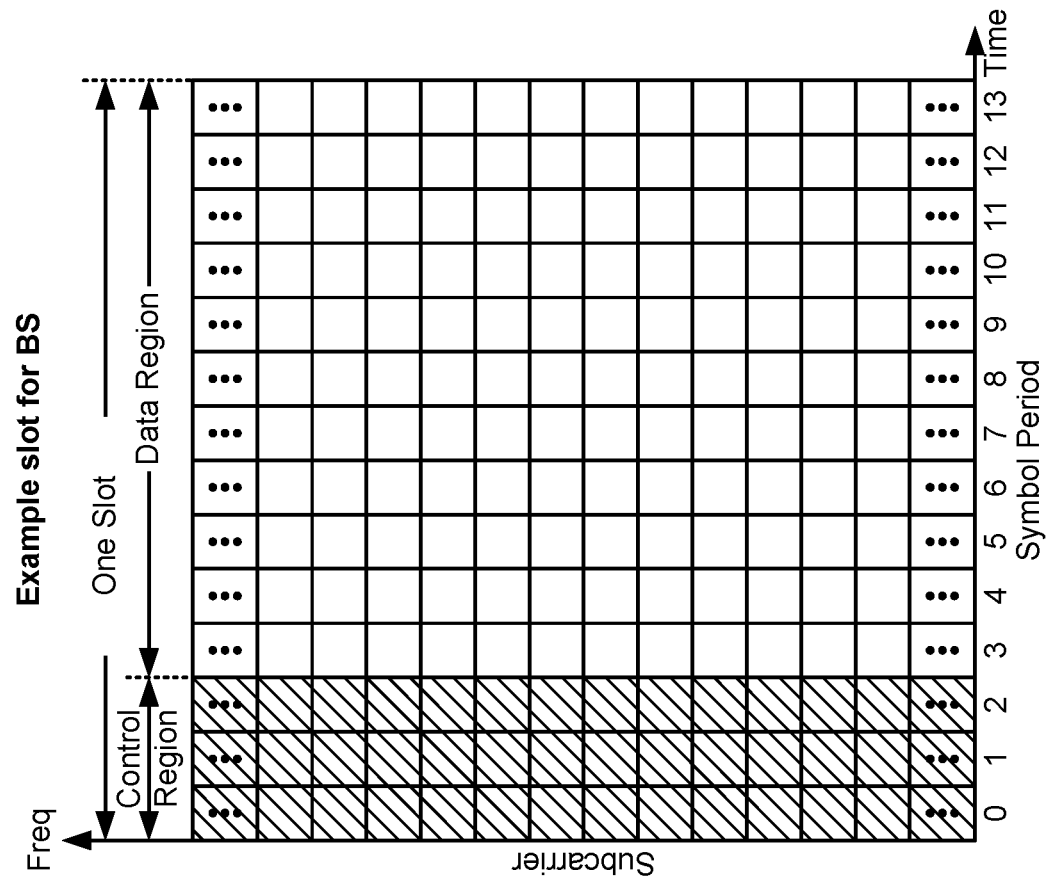
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what was described with regard to FIG. 4.

Figure 5:
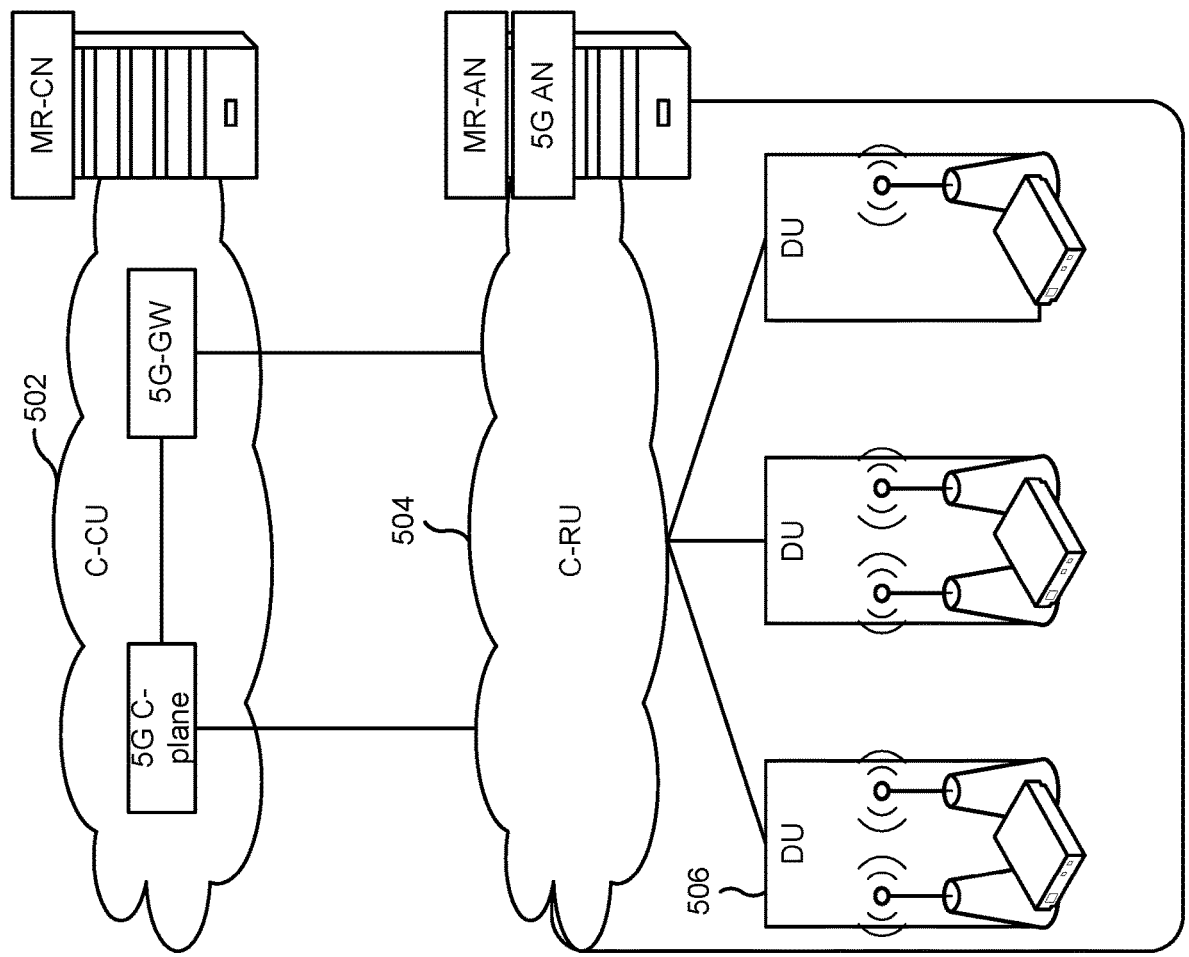
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what was described with regard to FIG. 5.

Figure 6:
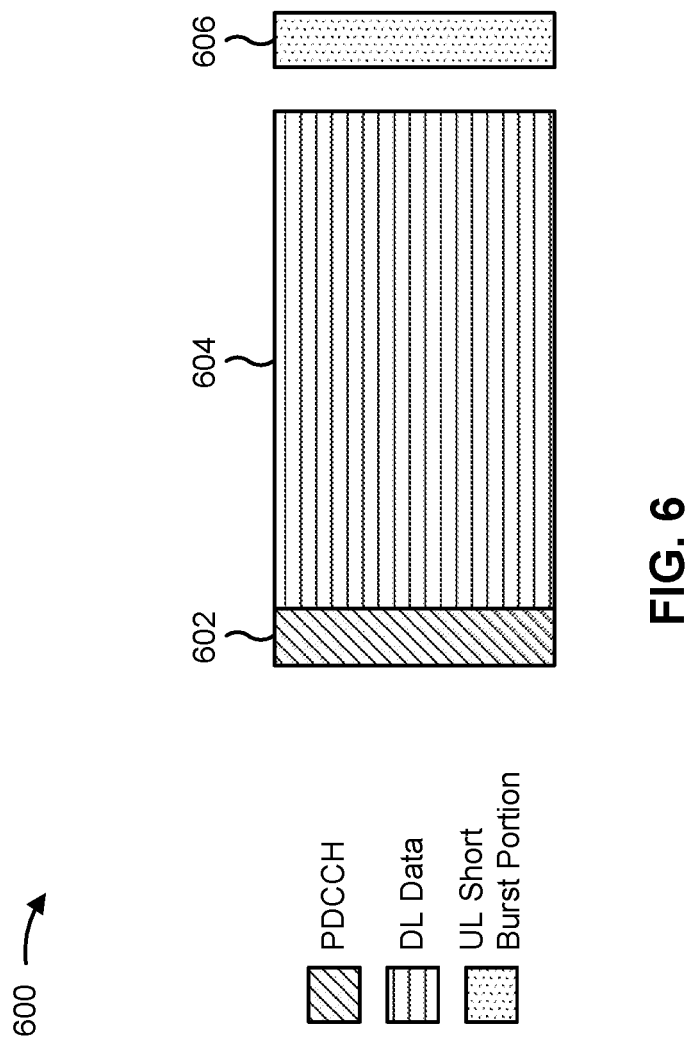
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what was described with regard to FIG. 6.

In a wireless network, a base station (BS) may communicate with a user equipment (UE) on a downlink. In some cases, the BS may transmit one or more layers (e.g., a data layer, a signaling or control layer, and/or the like), to be transmitted to the UE via one or more beams, of a plurality of candidate beams, on the downlink. In some cases, the UE may transmit, to the BS, a channel state information (CSI) feedback communication that identifies the one or more beams. In this way, the BS may beamform the transmission of the one or more layers by transmitting the one or more layers via the one or more beams identified in the CSI feedback communication transmitted by the UE.

In some cases, the CSI feedback communication may be configured based at least in part on a type of CSI feedback that is to be transmitted in the CSI feedback communication. For example, the CSI feedback communication may include Type I CSI feedback information, which may include information identifying a beam, of a set of beams, associated with the BS. As another example, the CSI feedback communication may include Type II CSI feedback information, which may include information identifying a linear combination of a set of beams based on a codebook.

While Type II CSI feedback enables the UE to signal, to the BS and via a CSI feedback communication, a set of beams via which the BS is to transmit downlink layers to the UE, the added functionality results in an increase in CSI feedback overhead. For example, a CSI feedback communication, that includes Type II CSI feedback information, may include information that identifies a respective beam index for each beam of a set of beams, may include information that identifies a respective linear combination coefficient for every subband/polarization combination associated with each beam of the set of beams, and/or the like. As a result, the CSI feedback communication may include information identifying a relatively large quantity of coefficients (e.g., 40 coefficients, 60 coefficients, and/or the like), which may cause the CSI feedback communication to consume an increased amount of uplink radio resources, between the BS and the UE, relative to Type I CSI feedback.

Some aspects described herein provide techniques and apparatuses for channel state information feedback compression. In CSI feedback, the UE is sometimes required to select a set of beams based on a codebook and feedback the linear combination of these beams as the preferred precoder. To feedback the linear combination coefficients associated with each identified beam, the UE may transfer the coefficients in the beam domain to a transfer domain for the purpose of overhead reduction. In the transfer domain, the coefficients associated with different beams may be based on different transfer domain bases. Therefore, it is possible to group certain identified beams and select common transfer domain bases for the beams within the same beam group.

In some aspects, the UE may identify, based at least in part on a codebook, a set of beams to identify in a CSI feedback communication. The UE may identify one or more beam groups associated with the set of beams. The UE may select respective one or more transfer domain bases, from a plurality of transfer domain bases, for each beam group of the one or more beam groups. The UE may determine a plurality of values, for a plurality of bits, that represent beam group identification information associated with the respective one or more beam groups and transfer domain basis selection information associated with each beam group of the one or more transfer domain bases. The UE may transmit, to a base station (BS), the plurality of bits in the CSI feedback communication. In this way, the UE may identify, in the CSI feedback communication, the set of beams and the coefficients associated with the set of beams in a manner that reduces the uplink overhead consumed by the CSI feedback communication. This reduces the uplink radio resources that are used to transmit CSI feedback, which permits other communications to be transmitted on the uplink using the uplink radio resources that would have otherwise been used to transmit the CSI feedback.

Figure 7A:
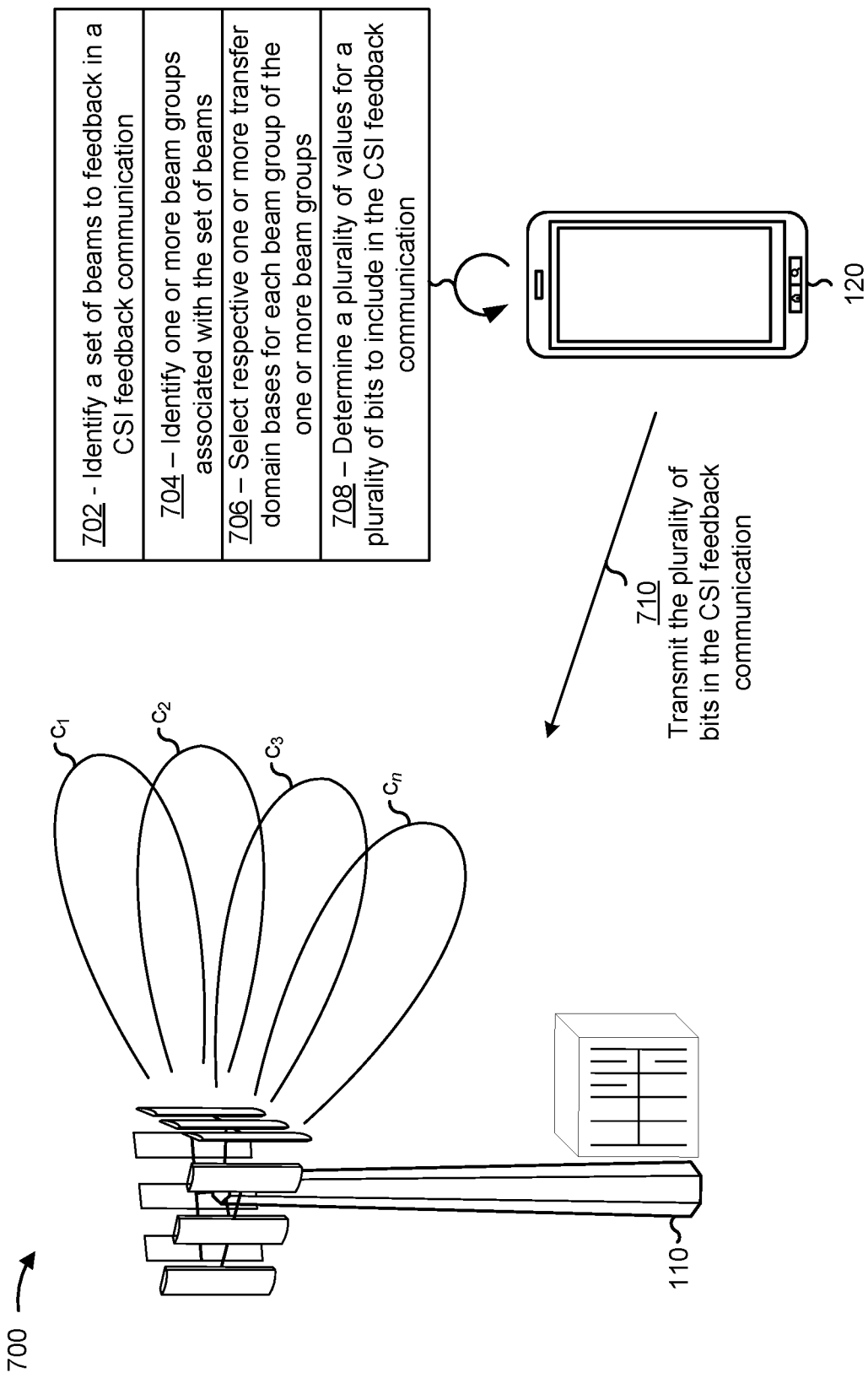
FIGS. 7A-7C are diagrams illustrating an example of channel state information feedback compression, in accordance with various aspects of the present disclosure.
Figure 7B:
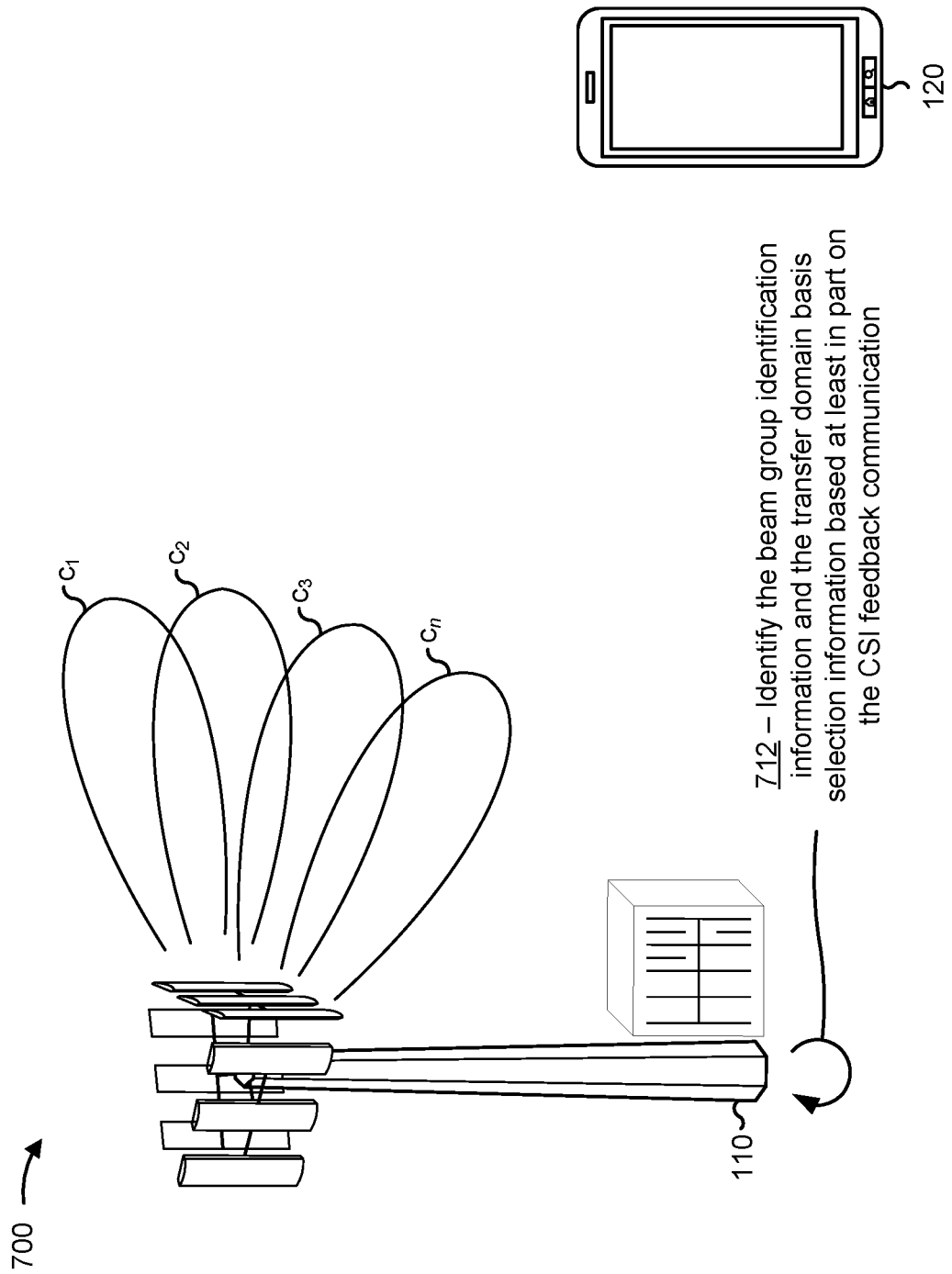
Figure 7C:
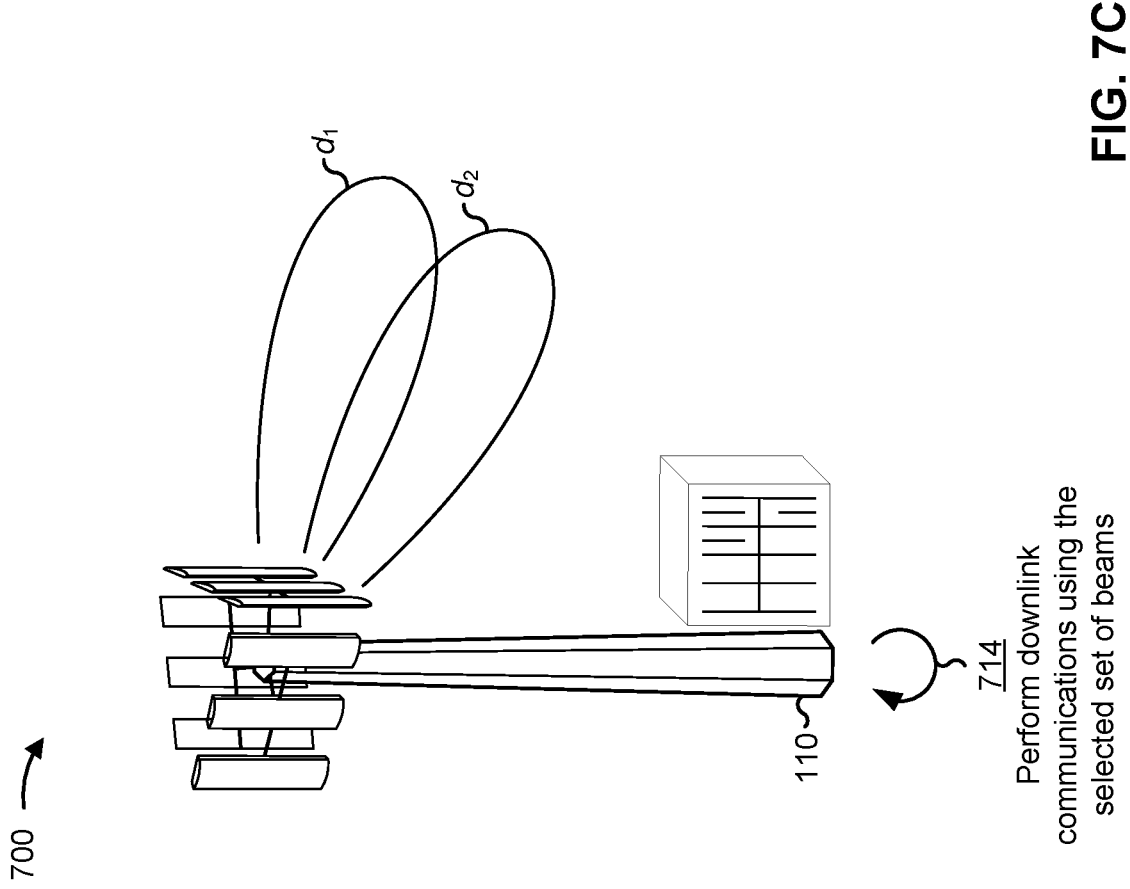

FIGS. 7A-7C are diagrams illustrating an example 700 of channel state information feedback compression, in accordance with various aspects of the present disclosure. As shown in FIGS. 7A-7C, example 700 may include a base station (e.g., BS 110) and a user equipment (e.g., UE 120). In some aspects, example 700 may include a greater quantity of BSs and/or UEs.

In some aspects, BS 110 and UE 120 may be included in a wireless network and may be communicatively connected via a wireless communication link. The wireless communication link may include a downlink and an uplink. In some aspects, BS 110 may configure UE 120 (e.g., via a signaling communication, such as a radio resource control (RRC) communication, a downlink channel information (DCI) communication, and/or the like) to provide, to BS 110, channel state information (CSI) feedback for downlink. The CSI feedback may be based on one or more CSI reference signals that are transmitted by the BS 110, on the downlink, via a plurality of CSI reference signal ports (e.g., port ci through port cn). UE 120 may perform various channel state measurements based at least in part on the one or more CSI reference signals (e.g., a reference signal received power (RSRP) measurement, a reference signal received quality (RSRQ) measurement, a received signal strength indicator (RSSI) measurement, a channel quality indicator (CQI) measurement, a multiple user CQI (MU-CQI) measurement, a precoding matrix indicator (PMI) measurement, a rank indicator (RI) measurement a signal to interference and noise ratio (SINR) measurement, and/or the like).

As shown in FIG. 7A, and by reference number 702, UE 120 may identify a set of beams, from a plurality of beams based on a codebook, that UE 120 is to feedback in a CSI feedback communication. In some aspects, the set of beams may be identified, in the CSI feedback communication, via Type II CSI feedback. For example, UE 120 may identify the set of beams based at least in part on the channel state measurements performed by UE 120 (e.g., one or more beams that have the greatest channel quality relative to other beams of the plurality of beams, one or more beams that provide UE 120 with the strongest signal relative to the other beams of the plurality of beams, one or more beams that are higher in priority than the other beams of the plurality of beams, one or more beams that are closer to a top (or bottom) of a beam list, and/or the like), may identify the set of beams based at least in part on a codebook (e.g., a linear combination codebook that identifies a linear combination precoder vector associated with the set of beams), and/or the like.

In some aspects, UE 120 may determine the quantity of beams, included in the set of beams, based at least in part on a quantity of layers, specified by UE 120, that BS 110 is to transmit to UE 120. For example, if the quantity of layers is one, the quantity of beams may be 2L beams. As another example, if the quantity of layers is r, the quantity of beams for the rth layer may be $2L^{(r)}$ beams.

As further shown in FIG. 7A, and by reference number 704, UE 120 may identify one or more beam groups associated with the set of beams. For example, each beam, included in the set of beams, may be included in a particular beam group that is configured by BS 110 and/or another component included in the wireless network (e.g., via RRC signaling, via a DCI communication, and/or the like). As an example, UE 120 may receive an RRC signaling communication that specifies beam $b_1$ is included in a first beam group and that beam $b_n$ is included in a second beam group.

In some aspects, the set of beams, transmitted by BS 110, may be associated with a plurality of spatial layers, and the one or more beam groups may include a plurality of sets of beam groups, where each layer, of the plurality of layers, is associated with a set of beam groups. In some aspects, the set of beam groups, associated with a layer, may be the same as another set of beam groups associated with another layer, may be a different from another set of beam groups associated with another layer, and/or the like.

In some aspects, UE 120 may determine the quantity of the one or more beam groups based at least in part on a quantity of layers. For example, if the quantity of layers is one, the quantity of the one or more beam groups may be B beam groups. As another example, if the quantity of layers is r, the quantity of beam groups for the rth layer may be $B^{(r)}$ beam groups. In some aspects, the quantity of the one or more beam groups may be configured by BS 110 and/or another component included in the wireless network (e.g., via RRC signaling, via a DCI communication, and/or the like).

As further shown in FIG. 7A, and by reference number 706, UE 120 may select respective one or more transfer domain bases, from a plurality of transfer domain bases, for each beam group of the one or more beam groups. For example, UE 120 may select one or more first transfer domain bases for a first beam group of the one or more beam groups, may select one or more second transfer domain bases for a second beam group of the one or more beam groups, and so on. In some aspects, a transfer domain basis, for a particular beam group, may represent the locations of coefficients associated with the particular beam group (and thus the beams, of the set of beams, included in the particular beam group).

In some aspects, UE 120 may select the respective one or more transfer domain bases such that a first subset of one or more transfer domain bases, for a first beam group of the one or more beam groups, includes a same quantity of transfer domain bases as a second subset of one or more transfer domain bases for a second beam group of the one or more beam groups. In some aspects, UE 120 may select the respective one or more transfer domain bases such that a first subset of one or more transfer domain bases, for a first beam group of the one or more beam groups, includes a different quantity of transfer domain bases than a second subset of one or more transfer domain bases for a second beam group of the one or more beam groups.

In some aspects, UE 120 may select the respective one or more transfer domain bases based at least in part on a transfer domain matrix, such as a discreet Fourier transform (DFT) basis matrix that includes a plurality of DFT bases, a discreet cosine transform (DCT) basis matrix that includes a plurality of DCT bases, and/or the like. In some aspects, UE 120 may select, for each beam group of the one or more beam groups, a respective combination of transfer domain bases of the respective one or more transfer domain bases. For example, a particular combination of transfer domain bases may include a combination of rows included in the transfer domain matrix, where each transfer domain basis, included in the combination of transfer domain bases, corresponds to a respective row in the transfer domain matrix. In some aspects, each respective combination of transfer domain bases may include the same quantity of transfer domain bases, may include a different quantity of transfer domain bases, and/or the like.

In some aspects, UE 120 may select the respective one or more transfer domain bases based at least in part on whether the plurality of bases defined in the codebook, are over-sampled bases or non-oversampled bases. For example, if the plurality of bases is non-oversampled, UE 120 may select the respective one or more transfer domain bases from a non-oversampled transfer domain bases set. As another example, if the plurality of bases is oversampled, UE 120 may select the respective one or more transfer domain bases from an oversampled transfer domain bases set by selecting, for each beam group of the one or more beam groups, a respective combination of non-oversampled transfer domain bases subsets identified in the oversampled transfer domain bases set. In this case, UE 120 may select a quantity of transfer domain bases, for a particular beam group, based at least in part on an oversampling rate associated with the oversampled transfer domain basis set.

In some aspects, UE 120 may select the respective one or more transfer domain bases based at least in part on the quantity of layers transmitted by BS 110. For example, UE 120 may select a first transfer domain basis, for a first beam group of the one or more beam groups, based at least in part on the first transfer domain basis and the first beam group being associated with a first layer; may select a second transfer domain basis, for a second beam group of the one or more beam groups, based at least in part on the second transfer domain basis and the second beam group being associated with a second layer; and/or the like.

As further shown in FIG. 7A, and by reference number 708, UE 120 may determine a plurality of values, for a plurality of bits, that represent beam group identification information associated with the one or more beam groups and transfer domain basis selection information associated with the respective one or more transfer domain bases for each beam group of the one or more beam groups. UE 120 may determine the plurality of values for the plurality of bits such that the plurality of values explicitly indicate the beam group identification information associated with the one or more beam groups and the transfer domain basis selection information associated with the respective one or more transfer domain bases for each beam of the one or more beam groups, such that the plurality of values identify one or more bit points, that can be referenced in a look-up table, to identify the beam group identification information associated with the one or more beam groups and the transfer domain basis selection information associated with the respective one or more transfer domain bases for each group of the one or more beam groups, such that the plurality of values identify a bit map that identifies the beam group identification information associated with the one or more beam groups and the transfer domain basis selection information associated with the respective one or more transfer domain bases for each beam group of the one or more beam groups, and/or the like.

In some aspects, the beam group identification information may include information identifying the one or more beam groups, information identifying a quantity of the one or more beam groups, information identifying beam group indices associated with the one or more beam groups, beam indices associated with the set of beams and/or the one or more beam groups, information identifying sets of beam groups included in the one or more beam groups, information identifying a quantity of beam groups included in the sets of beam groups, information identifying combinations of beam groups included in the sets of beam groups, and/or the like.

In some aspects, for all beam groups of the one or more beam groups, a multi-bit combinatorial indicator (e.g., an X2-bit combinatorial indicator) may identify a combination of subsets of transfer domain bases, of the respective one or more transfer domain bases for each beam group of the one or more beam groups. In some aspects, the set of beams (e.g., one or more beams) may include a subset of beams of the plurality of beams, and may or may not be grouped into beam groups. In this case, the transfer domain basis selection information may include information identifying the subset of beams, and the plurality of values of the plurality of bits may identify a multi-bit combinatorial indicator (e.g., an X2-bit combinatorial indicator) representing the information identifying the subset of transfer domain bases.

In some aspects, where beams are grouped into one or more beam groups, the transfer domain basis selection information may include information identifying the respective one or more transfer domain bases, information identifying a quantity of the respective one or more transfer domain bases, information identifying combinations of transfer domain bases, of the respective one or more transfer domain bases, that are associated with each beam group of the one or more beam groups, information identifying transfer domain basis indices for the respective one or more transfer domain bases, information identifying subsets of transfer domain bases, of the respective one or more transfer domain bases associated with each beam group of the one or more beam groups, information identifying transfer domain bases subset indices associated with the subsets of transfer domain bases, and/or the like.

In some aspects, where the plurality of values for the plurality of bits explicitly indicate the beam group identification information associated with the one or more beam groups, UE 120 may determine the plurality of values such that the plurality of bits explicitly indicate the one or more beam groups; such that a subset of bits, of the plurality of bits, may explicitly indicate the quantity of the one or more beam groups; such that a first subset of bits explicitly identifies a first quantity of beam groups included in a first set of beam groups, a second subset of bits explicitly identifies a second quantity of beam groups, and so on; and/or the like.

In some aspects, where the plurality of values for the plurality of bits explicitly indicate the transfer domain basis selection information associated with the respective one or more transfer domain bases for each beam group and the one or more beam group, UE 120 may determine the plurality of values such that the plurality of bits explicitly indicate the respective one or more transfer domain bases; a subset of bits, of the plurality of bits, may explicitly indicate the quantity of the respective one or more transfer domain bases; a subset of bits, of the plurality of bits, may explicitly indicate a transfer domain basis index for each respective transfer domain basis included in the respective one or more transfer domain bases; and or the like. In some aspects, UE 120 may determine the plurality of values such that the plurality of bits includes a first subset of bits that explicitly identifies a first subset of the respective one or more transfer domain bases, includes a second subset of bits that explicitly identifies a second subset of the respective one or more transfer domain bases, and so on. In some aspects, the first subset of bits and the second subset of bits may include the same quantity of bits, such as when the first subset of the respective one or more transfer domain bases and the second subset of the respective one or more transfer domain bases include the same quantity of transfer domain bases. In some aspects, the first subset of bits and the second subset of bits may include a different quantity of bits, such as when the first subset of the respective one or more transfer domain bases and the second subset of the respective one or more transfer domain bases include a different quantity of transfer domain bases.

In some aspects, where the plurality of values for the plurality of bits include one or more bit points that can be identified based at least in part on a look-up table, UE 120 may determine the plurality of values such that the plurality of bits specifies a bit point associated with a respective beam group index associated with each beam of the set of beams; a bit point associated with a first combination of beam groups included in a first set of beam groups, a bit point associated with a second combination of beam groups included in a second set of beam groups, and so on; a bit point associated with a first beam index that is associated with a first beam group of a first set of beam groups, a bit point associated with a second beam index that is associated with a second beam group of a second set of beam groups, and so on; and/or the like.

In some aspects, the look-up table may include a plurality of bit points, the look-up table may include a plurality of values that may be summed to determine a particular bit point, the look-up table may include a plurality of look-up tables that each includes a plurality of different bit points, and/or the like. In some aspects, the plurality of bit points, included in the look-up table, may include a respective bit point for different options for grouping the set of beams into the one or more beam groups (e.g., different combinations of beams), may include a respective bit point for different options for grouping the one or more beam groups into different sets of beam groups (e.g., different combinations of beam groups), may include a respective bit point for different identification results of a beam index associated with a beam group of a particular set of beam groups, and/or the like.

In some aspects, the plurality of bit points, included in the look-up table, may include a bit point that is associated with a combination of non-oversampled transfer domain bases subsets for a particular beam group of the one or more beam groups; a bit point that is associated with a combination of oversampled transfer domain bases subsets for a particular beam group of the one or more beam groups; a bit point that is associated with respective combinations of the plurality of transfer domain bases; a bit point that is associated with a particular transfer domain basis of the plurality of transfer domain bases; a bit point that identifies a combination; and/or the like.

In some aspects, UE 120 may determine the one or more bit points by performing a lookup in the look-up table. For example, UE 120 may determine a bit point that is associated with a combination of transfer domain bases, of the respective one or more transfer domain bases, by determining an order of the respective one or more transfer domain bases based at least in part on respective indices of the respective one or more transfer domain bases. UE 120 may determine the bit point by determining a first value, from the look-up table, based at least in part on a position of a first transfer domain basis, of the combination of transfer domain bases, in the order of the respective one or more transfer domain bases. UE 120 may determine the bit point by determining a second value, from the look-up table, based at least in part on a position of a second transfer domain basis, of the combination of transfer domain bases, in the order of the respective one or more transfer domain bases. UE 120 may determine the bit point by determining the bit point based at least in part on a summation of the first value and the second value. In some aspects, the respective one or more transfer domain bases may be ordered from highest index to lowest index, from lowest index to highest index, and/or the like.

In some aspects, where the plurality of values identify a bit map that identifies the beam group identification information associated with the one or more beam groups, UE 120 may determine the plurality of values such that the bit map identifies the one or more beam groups. For example, each bit, included in the bit map, may indicate whether a respective beam group is included in the one or more beam groups. In this case, the plurality of bits may include a quantity of bits that is based at least in part on a quantity of possible bit groups for the plurality of beams.

In some aspects, where the plurality of values identify a bit map that identifies the transfer domain basis selection information associated with the respective one or more transfer domain bases, UE 120 may determine the plurality of values such that the bit map identifies the respective one or more transfer domain bases. For example, each bit, included in the bit map, may indicate whether a respective transfer domain basis, of the plurality of transfer domain bases, is included in the respective one or more transfer domain bases. In this case, the plurality of bits may include a quantity of bits that is based at least in part on a quantity of possible transfer domain bases.

As further shown in FIG. 7A, and by reference number 710, UE 120 may transmit the CSI feedback communication to BS 110. In some aspects, the CSI feedback communication may include the plurality of bits that represent the beam group identification information associated with the one or more beam groups and the transfer domain basis selection information associated with the respective one or more transfer domain bases. In some aspects, UE 120 may transmit the CSI feedback communication to BS 110 based at least in part on performing the channel estimation, may transmit the CSI feedback communication to BS 110 at a periodic interval, may transmit the CSI feedback communication to BS 110 based at least in part on receiving a request for the CSI feedback communication from BS 110, and/or the like.

As shown in FIG. 7B, and by reference number 712, BS 110 may receive the CSI feedback communication from UE 120 and may identify, based at least in part on the plurality of bits included in the CSI feedback communication, the beam group identification information associated with the one or more beam groups and the transfer domain basis selection information associated with the respective one or more transfer domain bases. For example, BS 110 may identify the beam group identification information associated with the one or more beam groups and the transfer domain basis selection information associated with the respective one or more transfer domain bases based at least in part on the plurality of values of the plurality of bits.

In some aspects, where the plurality of values of the plurality of bits, included in the CSI feedback communication, explicitly identify the one or more beam groups and the respective one or more transfer domain bases, BS 110 may identify the one or more beam groups and the respective one or more transfer domain bases based at least on the plurality of values explicitly identifying the one or more beam groups and the respective one or more transfer domain bases.

In some aspects, where the plurality of values of the plurality of bits identify one or more bit points associated with the one or more beam groups and the respective one or more transfer domain bases, BS 110 may identify the one or more beam groups and the respective one or more transfer domain bases by performing a lookup in a look-up table (e.g., any of the look-up tables described above) based at least in part on one or more bit points identified by the plurality of values of the plurality of bits.

In some aspects, where the plurality of values of the plurality of bits identify a bit map associated with the one or more beam groups and the respective one or more transfer domain bases, BS 110 may determine whether each bit, included in the bit map, indicates that a particular beam group, of a plurality of beam groups, is included in the one or more beam groups; may determine whether each bit, included in the bit map, indicates that a particular transfer domain basis, of the plurality of transfer domain bases, is included in the respective one or more transfer domain bases; and/or the like.

As shown in FIG. 7C, and by reference number 714, BS 110 and UE 120 may perform downlink communications using the selected set of beams. For example, BS 110 may transmit one or more layers (e.g., two layers as indicated by $d_1$ and $d_2$ in FIG. 7C) to UE 120 using the selected set of beams. In this way, UE 120 may identify, in the CSI feedback communication, the set of beams and the coefficients associated with the set of beams in a manner that reduces the uplink overhead consumed by the CSI feedback communication. This reduces the uplink radio resources that are used to transmit CSI feedback, which permits other communications to be transmitted on the uplink using the uplink radio resources that would have otherwise been used to transmit the CSI feedback.

As indicated above, FIGS. 7A-7C are provided as an example. Other examples may differ from what was described with respect to FIGS. 7A-7C.

FIG. 8 is a diagram illustrating an example process 800 performed, for example, by a UE, in accordance with various aspects of the present disclosure. Example process 800 is an example where a UE (e.g., UE 120) performs channel state information feedback compression.

As shown in FIG. 8, in some aspects, process 800 may include identifying, based at least in part on a codebook, a set of beams to feedback in a channel state information (CSI) feedback communication (block 810). For example, the UE (e.g., using receive processor 258, transmit processor 264, controller/processor 280, memory 282, and/or the like) may identify, based at least in part on a codebook, a set of beams to feedback in a channel state information (CSI) feedback communication, as described above.

As further shown in FIG. 8, in some aspects, process 800 may include identifying one or more beam groups associated with the set of beams (block 820). For example, the UE (e.g., using receive processor 258, transmit processor 264, controller/processor 280, memory 282, and/or the like) may identify one or more beam groups associated with the set of beams, as described above.

As further shown in FIG. 8, in some aspects, process 800 may include selecting respective one or more transfer domain bases, from a plurality of transfer domain bases, for each beam group of the one or more beam groups (block 830). For example, the UE (e.g., using receive processor 258, transmit processor 264, controller/processor 280, memory 282, and/or the like) may select respective one or more transfer domain bases, from a plurality of transfer domain bases, for each beam group of the one or more beam groups, as described above.

As further shown in FIG. 8, in some aspects, process 800 may include determining a plurality of values, for a plurality of bits, that represent beam group identification information associated with the one or more beam groups and transfer domain basis selection information associated with the respective one or more transfer domain bases for each beam group of the one or more beam groups (block 840). For example, the UE (e.g., using receive processor 258, transmit processor 264, controller/processor 280, memory 282, and/or the like) may determine a plurality of values, for a plurality of bits, that represent beam group identification information associated with the respective one or more beam groups and transfer domain basis selection information associated with the one or more transfer domain bases for each beam group of the one or more beam groups, as described above.

As further shown in FIG. 8, in some aspects, process 800 may include transmitting, to a base station (BS), the plurality of bits in the CSI feedback communication (block 850). For example, the UE (e.g., using receive processor 258, transmit processor 264, controller/processor 280, memory 282, and/or the like) may transmit, to a base station (BS), the plurality of bits in the CSI feedback communication, as described above.

Process 800 may include additional aspects, such as any single aspect and/or any combination of aspects described below and/or in connection with one or more other processes described elsewhere herein.

In a first aspect, the plurality of transfer domain bases is based at least in part on at least one of a plurality of discreet Fourier transform (DFT) bases, a plurality of discreet cosine transform (DCT) bases, and/or the like. In a second aspect, alone or in combination with the first aspect, the beam group identification information comprises information identifying a quantity of the one or more beam groups, and the plurality of bits comprises a subset of bits to explicitly indicate the quantity of the one or more beam groups, wherein a quantity of the subset of bits to explicitly indicate the quantity of the one or more beam groups is based at least in part on a ceiling of a logarithmic function, based by 2, of a quantity of beams included in the set of beams. In a third aspect, alone or in combination with one or more of the first or second aspects, a quantity of the one or more beam groups is configured via a radio resource communication (RRC) or indicated via a downlink control information (DCI) communication.

In a fourth aspect, alone or in combination with one or more of the first through third aspects, the transfer domain basis selection information comprises, for a particular beam group of the one or more beam groups, information identifying a quantity of one or more transfer domain bases for the particular beam group, and the plurality of bits comprises a subset of bits to explicitly indicate the quantity of the one or more transfer domain bases for the particular beam group, wherein a quantity of the subset of bits to explicitly indicate the quantity of the one or more transfer domain bases for the particular beam group is based at least in part on a ceiling of a logarithmic function, based by 2, of a quantity of transfer domain bases in the plurality of transfer domain bases. In a fourth aspect, alone or in combination with one or more of the first through third aspects, the transfer domain basis selection information comprises a bit point, for a particular beam group of the one or more beam groups, that is associated with a combination of transfer domain bases of one or more transfer domain bases for a particular beam group.

In a fifth aspect, alone or in combination with one or more of the first through fourth aspects, the bit point, associated with the combination of transfer domain bases is identified in a look-up table, wherein the look-up table identifies a plurality of bit points that identifies respective combinations of transfer domain bases of the plurality of transfer domain bases, wherein a quantity of bit points, included the plurality of bit points, is based at least on a combination of numbers for selecting the one or more transfer domain bases for the particular beam group from a quantity of transfer domain bases included the plurality of transfer domain bases, and wherein a quantity of bits for reporting the bit point is based at least in part on, a ceiling of a logarithmic function, based by 2, of a quantity of bit points included the plurality of bit points included in the look-up table. In a sixth aspect, alone or in combination with one or more of the first through fifth aspects, the UE may be configured to determine an order of the one or more transfer domain bases, for the particular beam group, based at least in part on respective indices of the one or more transfer domain bases for the particular beam group, determine a first value, from a look-up table, based at least in part on a position of a first transfer domain basis, of the combination of transfer domain bases, in the order of the one or more transfer domain bases for the particular beam group, determine a second value, from the look-up table, based at least in part on a position of a second transfer domain basis, of the combination of transfer domain bases, in the order of the one or more transfer domain bases for the particular beam group, and determine the bit point based at least in part on a summation of the first value and the second value.

In a seventh aspect, alone or in combination with one or more of the first through sixth aspects, a quantity of the respective one or more transfer domain bases is configured via an RRC or indicated via a DCI communication. In an eighth aspect, alone or in combination with one or more of the first through seventh aspects, the transfer domain basis selection information comprises for all beam groups of the one or more beam groups, a bit point that identifies a combination of subsets of transfer domain bases, of the respective one or more transfer domain bases for each beam group of the one or more beam groups, wherein each subset of transfer domain bases, included in the combination of subsets, is associated with a particular beam group of the one or more beam groups.

In a ninth aspect, alone or in combination with one or more of the first through eighth aspects, the bit point that identifies the combination of subsets of transfer domain bases is identified in a look-up table, and the look-up table identifies a plurality of bit-points associated with a plurality of combinations of subsets of the plurality of transfer domain bases, wherein a quantity of bit points, included in the plurality of bit points, is based at least in part on, a multiplication of a combination numbers, for selecting the respective one or more transfer domain bases for each beam group of the one or more beam groups, a quantity of transfer domain bases included in the plurality of transfer domain bases, and wherein a quantity of bits for reporting the bit point is based at least in part on, a ceiling of a logarithmic function, based by 2, a quantity of the combinations of the subsets of transfer domain bases. In a tenth aspect, alone or in combination with one or more of the first through ninth aspects, the transfer domain basis selection information comprises a bit map, for a particular beam group of the one or more beam groups, that identifies one or more transfer domain bases for the particular beam group, wherein each bit, included in the bit map, indicates whether a respective transfer domain basis, of the plurality of transfer domain bases, is included in the one or more transfer domain bases for the particular beam group, and wherein a quantity of bits for reporting the bit map is based at least in part on a quantity of transfer domain bases included in the plurality of transfer domain bases.

In an eleventh aspect, alone or in combination with one or more of the first through tenth aspects, the transfer domain basis selection information comprises information identifying a quantity of transfer domain bases included in the one or more transfer domain bases for a particular beam group of the one or more beam groups, and a plurality of bits that explicitly indicate a transfer domain basis index for each respective transfer domain basis included in the one or more transfer domain bases for the particular beam group of the one or more beam groups, wherein a quantity of bits, included in the plurality of bits, is based at least in part on a summation number of respective ceilings, for a logarithmic function based by 2, based at least in part on a quantity of transfer domain bases included in the plurality of transfer domain bases, and wherein the summation number is based at least in part on the quantity of transfer domain bases included in the one or more transfer domain bases for the particular beam group. In a twelfth aspect, alone or in combination with one or more of the first through eleventh aspects, the set of beams is transmitted, by the BS, in a plurality of layers, the one or more beam groups comprises a first set of beam groups associated with a first layer of the plurality of layers and a second set of beam groups associated with a second layer of the plurality of layers, and the first set of beam groups and the second set of beam groups are a same set of beam groups for the plurality of layers.

In a thirteenth aspect, alone or in combination with one or more of the first through twelfth aspects, the beam group identification information comprises a plurality of subsets of bits of the plurality of bits, wherein each subset of bits, of the plurality of subsets of bits, is associated with a respective beam of set of beams, and wherein each subset of bits, of the plurality of subsets of bits, identifies a respective beam group index associated with a respective beam group of the one or more beam groups, wherein a quantity of bits, included in each subset of bits, is based at least in part on a ceiling of a logarithmic function, based by 2, of a quantity of beam groups in the one or more beam groups, and wherein a quantity of subsets of bits, included in the plurality of subsets of bits, is based at least in part on a quantity of beams included in the set of beams. In a fourteenth aspect, alone or in combination with one or more of the first through thirteenth aspects, the beam group identification information comprises a bit point that identifies, based at least in part on a look-up table, a respective beam group index associated with each beam of the set of beams, the look-up table includes a plurality of bit points, and a respective bit point, included in the plurality of bit points, is associated with a different option for grouping the set of beams into the one or more beam groups, wherein a quantity of bit points, included in the plurality of bit points, is based at least in part on a combination number for grouping the set of beams into the one or more beam groups, and wherein a quantity of bits for reporting the bit point is based at least in part on a ceiling of a logarithmic, based by 2, of the quantity of bit points in the plurality of bit points.

In a fifteenth aspect, alone or in combination with one or more of the first through fourteenth aspects, the set of beams is identified, by the BS, in a plurality of layers, the one or more beam groups comprises a first set of beam groups associated with a first layer of the plurality of layers and a second set of beam groups associated with a second layer of the plurality of layers, and the first set of beam groups and the second set of beam groups are different sets of beam groups. In a sixteenth aspect, alone or in combination with one or more of the first through fifteenth aspects, the beam group identification information comprises a first plurality of bits identifying a first quantity of beam groups included in the first set of beam groups and a second plurality of bits identifying a second quantity of beam groups included in the second set of beam groups, wherein a quantity of bits, for reporting the first plurality of bits, is based at least in part on a ceiling of a logarithmic function, based by 2, of the first quantity of beam groups included in the first set of beam groups, and wherein a quantity of bits, for reporting the second plurality of bits, is based at least in part on a ceiling of a logarithmic function, based by 2, of the second quantity of beam groups included in the second set of beam groups.

In a sixteenth aspect, alone or in combination with one or more of the first through fifteenth aspects, the beam group identification information comprises a bit point that identifies, based at least in part on a look-up table, a first quantity of beam groups included in the first set of beam groups and a second quantity of beam groups included in the second set of beam groups, the look-up table includes a plurality of bit points, and each respective bit-point, of the plurality of bit points, is associated with a different quantity of beam groups, wherein a quantity of bit points, of the plurality of bit points, is based at least in part on a multiplication of the first quantity of beam groups included in the first set of beam groups and the second quantity of beam groups included in the second set of beam groups, and wherein a quantity of bits, for reporting the bit point, is based at least in part on a ceiling of a logarithmic function, based by 2, of the quantity of bit points of the plurality of bit points.

In a seventeenth aspect, alone or in combination with one or more of the first through sixteenth aspects, the beam group identification information comprises a first bit point that identifies, based at least in part on a first look-up table, a respective first beam index associated with a respective first beam group of the first set of beam groups, the first look-up table includes a first plurality of bit points, and each bit point, of the first plurality of bit points, is associated with a different identification result of a respective beam index associated with a respective beam group of the first set of beam groups; and a second bit point that identifies, based at least in part on a first look-up table, a respective second beam index associated with a respective second beam group of the second set of beam groups, the second look-up table contains a second plurality of bit-points, and each bit point, of the second plurality of bit points, is associated with a different identification result of a respective beam index associated with a respective beam group of the second set of beam groups.

In an eighteenth aspect, alone or in combination with one or more of the first through seventeenth aspects, a quantity of bit points, of the first plurality of bit points, is based at least in part on a combination number for grouping the set of beams into the first set of beam groups, wherein a quantity of bits for reporting the first bit point is based at least in part on a ceiling of a logarithmic, based by 2, of the quantity of bit points of the first plurality of bit points, wherein a quantity of bit points, of the second plurality of bit points, is based at least in part on a combination number for grouping the set of beams into the second set of beam groups, wherein a quantity of bits for reporting the second bit point is based at least in part on a ceiling of a logarithmic, based by 2, of the quantity of bit points of the second plurality of bit points. In a nineteenth aspect, alone or in combination with one or more of the first through eighteenth aspects, when selecting the one or more transfer domain bases, the UE may be configured to select a first transfer domain basis, of the plurality of transfer domain bases, for the first set of beam groups based at least in part on the first transfer domain basis being associated with the first layer, and select a second transfer domain basis, of the plurality of transfer domain bases, for the second set of beam groups based at least in part on the second transfer domain basis being associated with the second layer.

In a twentieth aspect, alone or in combination with one or more of the first through nineteenth aspects, a first subset of the one or more transfer domain bases, for a first beam group of the one or more beam groups, includes a same quantity of transfer domain bases as a second subset of the one or more transfer domain bases for a second beam group of the one or more beam groups, the transfer domain basis selection information comprises a first plurality of bits that identify the first subset of the one or more transfer domain bases for the first beam group, and a second plurality of bits that identify the second subset of the one or more transfer domain bases for the second beam group, and the first plurality of bits and the second plurality of bits are a same quantity of bits. In a twenty-first aspect, alone or in combination with one or more of the first through twentieth aspects, a first subset of the one or more transfer domain bases, for a first beam group of the one or more beam groups, includes a different quantity of transfer domain bases relative to a second subset of the one or more transfer domain bases for a second beam group of the one or more beam groups, the transfer domain basis selection information comprises a first plurality of bits that identify the first subset of the one or more transfer domain bases for the first beam group and a second plurality of bits that identify the second subset of the one or more transfer domain bases for the second beam group, and the first plurality of bits and the second plurality of bits are a different quantity of bits.

In a twenty-second aspect, alone or in combination with one or more of the first through twenty-first aspects, the plurality of transfer domain bases comprises an oversampled transfer domain bases set, selecting the respective one or more transfer domain bases comprises selecting the respective one or more transfer domain bases from the oversampled transfer domain bases set, and a quantity of transfer domain bases, included in the respective one or more transfer domain bases, is based at least in part on an oversampling rate associated with the oversampled transfer domain bases set. In a twenty-third aspect, alone or in combination with one or more of the first through twenty-second aspects, selecting the respective one or more transfer domain bases comprises selecting, for each beam group of the one or more beam groups, a respective combination of non-oversampled transfer domain bases subsets identified in an oversampled transfer domain bases set.

In a twenty-fourth aspect, alone or in combination with one or more of the first through twenty-third aspects, the transfer domain basis selection information comprises a bit point identifying, based at least in part on a look-up table, the respective combination of non-oversampled transfer domain bases subsets, for each beam group of the one or more beam groups, by a bit point, the look-up table includes a plurality of bit points, and each respective bit point, of the plurality of bit points, is associated with a particular combination of selections of non-oversampled transfer domain bases subsets, wherein a quantity of bit points, included in the plurality of bit points, is based at least in part on an exponential function comprising, a base being a quantity of the set of beam groups, and an argument being an oversampling rate associated with an oversampled transfer domain bases set, and wherein a quantity of bits for reporting the bit point is based at least in part on a ceiling of a logarithmic function, based by 2, of the quantity of bit points included in the plurality of bits points.

In a twenty-fifth aspect, alone or in combination with one or more of the first through twenty-fourth aspects, the transfer domain basis selection information comprises information identifying a respective transfer domain bases subset index, associated with the respective combination of non-oversampled transfer domain bases subsets for each beam group of the one or more beam groups, wherein a quantity of bits for reporting each subset index is based at least in part on a ceiling of a logarithmic function, based by 2, of the oversampling rate associated with the oversampled transfer domain bases set, and wherein a quantity of non-oversampled transfer domain bases subsets is based at least in part on a quantity of the respective one or more beam groups. In a twenty-sixth aspect, alone or in combination with one or more of the first through twenty-fifth aspects, the plurality of transfer domain bases is consisted of a non-oversampled transfer domain bases set. In a twenty-seventh aspect, alone or in combination with one or more of the first through twenty-sixth aspects, the transfer domain basis selection information comprises for all beam groups of the one or more beam groups, a multi-bit combinatorial indicator that identifies a combination of subsets of transfer domain bases, of the respective one or more transfer domain bases for each beam group of the one or more beam groups, wherein each subset of transfer domain bases, included in the combination of subsets, is associated with a particular beam group of the one or more beam groups.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
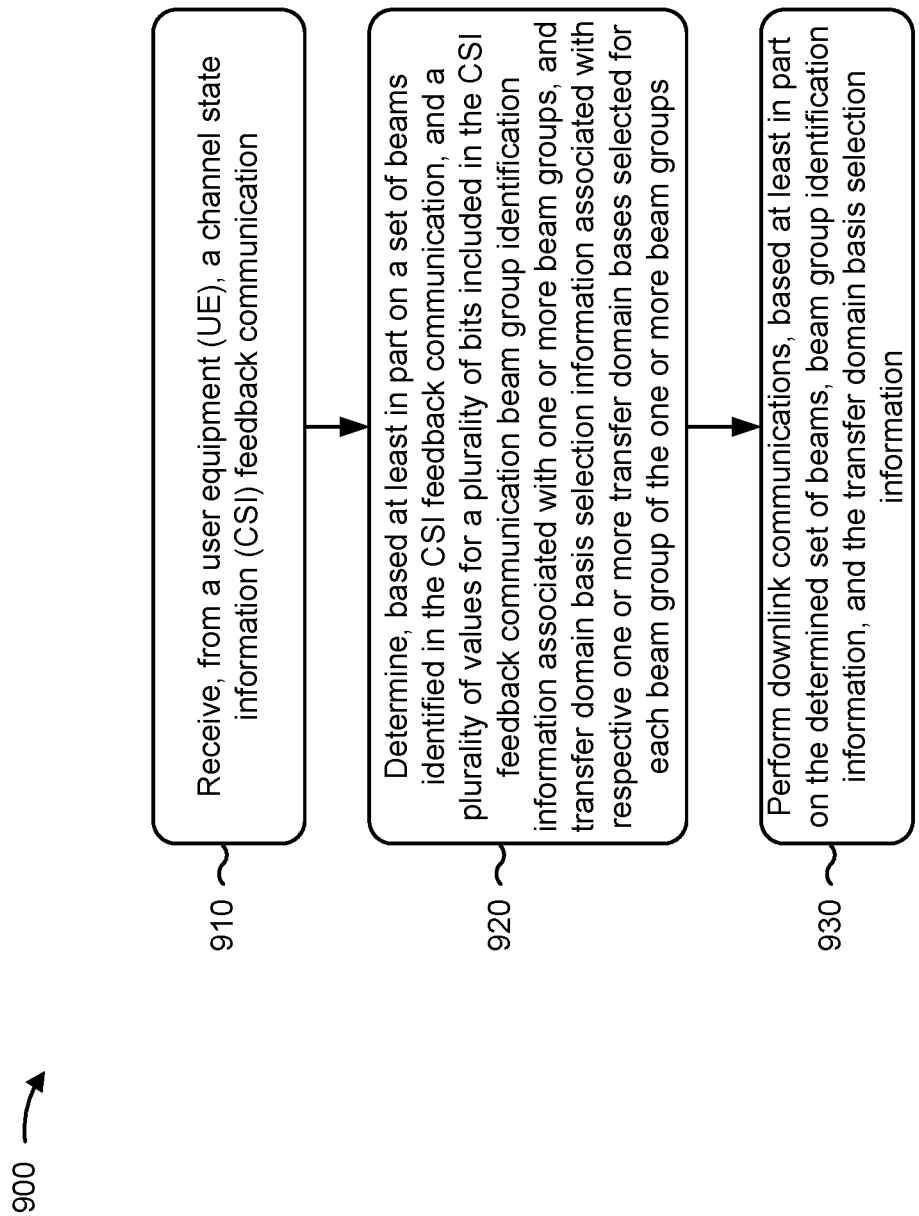
FIG. 9 is a diagram illustrating an example process performed, for example, by a BS, in accordance with various aspects of the present disclosure.

FIG. 9 is a diagram illustrating an example process 900 performed, for example, by a BS, in accordance with various aspects of the present disclosure. Example process 900 is an example where a BS (e.g., BS 110) performs channel state information feedback compression.

As shown in FIG. 9, in some aspects, process 900 may include receiving, from a UE, a CSI feedback communication (block 910). For example, the BS (e.g., using receive processor 238, controller/processor 240, memory 242, and/or the like) may receive, from a UE, a CSI feedback communication, as described above.

As further shown in FIG. 9, in some aspects, process 900 may include determining, based at least in part on a set of beams identified in the CSI feedback communication, and a plurality of values for a plurality of bits included in the CSI feedback communication, beam group identification information associated with one or more beam groups and transfer domain basis selection information associated with respective one or more transfer domain bases selected for each beam group of the one or more beam groups (block 920). For example, the BS (e.g., using transmit processor 220, receive processor 230, controller/processor 240, memory 242, and/or the like) may determining, based at least in part on a set of beams identified in the CSI feedback communication, and a plurality of values for a plurality of bits included in the CSI feedback communication, beam group identification information associated with one or more beam groups and transfer domain basis selection information associated with respective one or more transfer domain bases selected for each beam group of the one or more beam groups, as described above.

As further shown in FIG. 9, in some aspects, process 900 may include performing downlink communications, based at least in part on the set of beams, beam group identification information, and the transfer domain basis selection information (block 930). For example, the BS (e.g., using transmit processor 220, receive processor 230, controller/processor 240, memory 242, and/or the like) may performing downlink communications, based at least in part on the set of beams, beam group identification information, and the transfer domain basis selection information, as described above.

Process 900 may include additional aspects, such as any single aspect and/or any combination of aspects described below and/or in connection with one or more other processes described elsewhere herein.

In a first aspect, the respective one or more transfer domain bases are included in a plurality of transfer domain bases, and the plurality of transfer domain bases is based at least in part on at least one of a plurality of DFT bases or a plurality of DCT bases. In a second aspect, alone or in combination with the first aspect, the beam group identification information comprises information identifying a quantity of the one or more beam groups, and the plurality of bits comprises a subset of bits to explicitly indicate the quantity of the one or more beam groups, wherein a quantity of bits, included in the subset of bits to explicitly indicate the quantity of the one or more beam groups, is based at least in part on a ceiling of a logarithmic function, based by 2, of a quantity of beams included in the set of beams.

In a third aspect, alone or in combination with one or more of the first or second aspects, a quantity of the one or more beam groups is configured via an RRC communication or indicated via a DCI communication. In a fourth aspect, alone or in combination with one or more of the first through third aspects, the transfer domain basis selection information comprises for a particular beam group of the one or more beam groups, information identifying a quantity of one or more transfer domain bases for the particular beam group, and wherein the plurality of bits comprises a subset of bits to explicitly indicate the quantity of the one or more transfer domain bases for the particular beam group, wherein a quantity of bits, included in the subset of bits to explicitly indicate the quantity of the one or more transfer domain bases for the particular beam group, is based at least in part on a ceiling of a logarithmic function, based by 2, of a quantity of transfer domain bases in the plurality of transfer domain bases.

In a fifth aspect, alone or in combination with one or more of the first through fourth aspects, a quantity of the respective one or more transfer domain bases is configured via an RRC communication or indicated via a DCI communication. In a sixth aspect, alone or in combination with one or more of the first through fifth aspects, the transfer domain basis selection information comprises a bit point, for a particular beam group of the one or more beam groups, that is associated with a combination of transfer domain bases of one or more transfer domain bases for the particular beam group. In a seventh aspect, alone or in combination with one or more of the first through sixth aspects, the bit point, associated with the combination of transfer domain bases is identified in a look-up table, and the look-up table identifies a plurality of bit points that identifies respective combinations of transfer domain bases of a plurality of transfer domain bases, wherein a quantity of bit points, included in the plurality of bit points, is based at least in part on a combination number for selecting the one or more transfer domain bases for the particular beam group based at least in part on a quantity of transfer domain bases in the plurality of transfer domain bases, and wherein a quantity of bits, for reporting the bit point, is based at least in part on a ceiling of a logarithmic function, based by 2, of the quantity of bit points, included in the plurality of bit points, included in the look-up table.

In an eighth aspect, alone or in combination with one or more of the first through seventh aspects, the BS may be configured to identify respective transfer domain basis indexes of the one or more respective transfer domain basis using a table that identifies transfer domain basis indexes of transfer domain basis based at least in part on a value of an indicator of the CSI report. In a ninth aspect, alone or in combination with one or more of the first through eighth aspects, the BS may be configured to identify, in a row or column corresponding to an order of the one or more transfer domain bases with a greatest index in the table, a first greatest value that is less than or equal to the value of the indicator, determine an index of a transfer domain basis with the greatest index based at least in part on the column or row index of the first greatest value, update the value of the indicator by subtracting the first greatest value from the indicator, identify, in the row or column corresponding to the order of the one or more transfer domain bases with a second greatest index in the table, a second greatest value that is less than or equal to the value of the indicator, determine an index of a beam with the second greatest index based at least on part on the row or column index of the second greatest value, and update the value of the indicator by subtracting the second greatest value from the indicator to identify indexes of remaining transfer domain basis with smaller indexes.

In a tenth aspect, alone or in combination with one or more of the first through ninth aspects, the transfer domain basis selection information comprises for all beam groups of the one or more beam groups, a bit point that identifies a combination of subsets of transfer domain bases, of the respective one or more transfer domain bases for each beam group of the one or more beam groups, and each subset of transfer domain bases, included in the combination of subsets, is associated with a particular beam group of the one or more beam groups. In the aspects, the bit point that identifies the combination of subsets of transfer domain bases is identified in a look-up table, and the look-up table identifies a plurality of bit-points associated with a plurality of combinations of subsets of a plurality of transfer domain bases, wherein a quantity of bit points, included in the plurality of bit points, is based at least in part on a multiplication of combination numbers for selecting the respective one or more transfer domain bases for each beam group of the one or more beam groups, from a quantity of transfer domain bases included in the plurality of transfer domain bases, and wherein a quantity of bits for reporting the bit point is based at least in part on a ceiling of a logarithmic function, based by 2, of a quantity of the combinations of the subsets of transfer domain bases.

In an eleventh aspect, alone or in combination with one or more of the first through tenth aspect, the transfer domain basis selection information comprises a bit map, for a particular beam group of the one or more beam groups, that identifies one or more transfer domain bases for the particular beam group, and each bit, included in the bit map, indicates whether a respective transfer domain basis, of a plurality of transfer domain bases, is included in the one or more transfer domain bases for the particular beam group, wherein a quantity of bits needed for reporting the bit map is based at least in part on a quantity of transfer domain bases in the plurality of transfer domain bases. In a twelfth aspect, alone or in combination with one or more of the first through eleventh aspects, the transfer domain basis selection information comprises information identifying a quantity of transfer domain bases included in one or more transfer domain bases for a particular beam group of the one or more beam group, and a plurality of bits that explicitly indicate a transfer domain basis index for each respective transfer domain basis included in the one or more transfer domain bases for the particular beam group of the one or more beam groups, wherein a quantity of bits, included in the plurality of bits, is based at least in part on a summation number of respective ceilings, for a logarithmic function based by 2, based at least in part on a quantity of transfer domain bases included in the plurality of transfer domain bases, and wherein the summation number is based at least in part on the quantity of transfer domain bases included in the one or more transfer domain bases for the particular beam group.

In a thirteenth aspect, alone or in combination with one or more of the first through twelfth aspects, the set of beams is identified in a plurality of layers, and the one or more beam groups comprises a first set of beam groups associated with a first layer of the plurality of layers and a second set of beam groups associated with a second layer of the plurality of layers, wherein the first set of beam groups and the second set of beam groups are a same set of beam groups for the plurality of layers. In a twelfth aspect, alone or in combination with one or more of the first through thirteenth aspects, the beam group identification information comprises a plurality of subsets of bits of the plurality of bits, wherein each subset of bits, of the plurality of subsets of bits, is associated with a respective beam of the one or more of beams, and wherein each subset of bits, of the plurality of subsets of bits, identifies a respective beam group index associated with a respective beam group of the one or more beam groups, wherein a quantity of bits included in each subset of bits is based at least in part on a ceiling of a logarithmic function, based by 2, of a quantity of beam groups included in the one or more beam groups, and wherein the quantity of subsets is based at least in part on the number of beams within the set of beams.

In a fourteenth aspect, alone or in combination with one or more of the first through thirteenth aspects, the beam group identification information comprises a bit point that identifies, based at least in part on a look-up table, a respective beam group index associated with each beam of the set of beams, wherein the look-up table includes a plurality of bit points, and wherein a respective bit point, included in the plurality of bit points, is associated with a different option for grouping the set of beams into the one or more beam groups, wherein a quantity of bit points included in the plurality of bit points is based at least in part on a combination number of grouping the set of beams into the one or more beam groups and wherein a quantity of bits, for reporting the bit point, is based at least in part on a ceiling of a logarithmic, based by 2, of the quantity of bit points included in the plurality of bit points. In a fourteenth aspect, alone or in combination with one or more of the first through thirteenth aspects, the set of beams is identified in a plurality of layers, wherein the one or more beam groups comprise a first set of beam groups associated with a first layer of the plurality of layers, and a second set of beam groups associated with a second layer of the plurality of layers, and wherein the first set of beam groups and the second set of beam groups are different sets of beam groups.

In a fifteenth aspect, alone or in combination with one or more of the first through fourteenth aspects, the beam group identification information comprises a first plurality of bits identifying a first quantity of beam groups included in the first set of beam groups, and a second plurality of bits identifying a second quantity of beam groups included in the second set of beam groups, wherein a quantity of bits, for reporting the first plurality of bits, is based at least in part on a ceiling of a logarithmic function, based by 2, of a first quantity of beams included in the first set of beam groups, and wherein a quantity of bits, for reporting the second plurality of bits, is based at least in part on a ceiling of a logarithmic function, based by 2, of a second quantity of beams included in the second set of beam groups. In a sixteenth aspect, alone or in combination with one or more of the first through fifteenth aspects, the beam group identification information comprises a bit point that identifies, based at least in part on a look-up table, a first quantity of beam groups included in the first set of beam groups and a second quantity of beam groups included in the second set of beam groups, wherein the look-up table includes a plurality of bit points, and wherein each respective bit point, of the plurality of bit points, is associated with a different quantity of beam groups, wherein a quantity of bit points, of the plurality of bit points, is based at least in part on a multiplication, among a quantity of beams associated with a respective set of beam groups, and a quantity of beams associated with at least the second set of beam groups, and wherein a quantity of bits, for reporting the bit point, is based at least in part on a ceiling of a logarithmic function, based by 2, of the quantity of bit points of the plurality of bit points.

In a seventeenth aspect, alone or in combination with one or more of the first through sixteenth aspects, the beam group identification information comprises a first bit point that identifies, based at least in part on a first look-up table, a respective first beam index associated with a respective first beam group of the first set of beam groups, wherein the first look-up table includes a first plurality of bit points, and wherein each bit point, of the first plurality of bit points, is associated with a different identification result of a respective beam index associated with a respective beam group of the first set of beam groups. In an eighteenth aspect, alone or in combination with one or more of the first through seventeenth aspects, a second bit point that identifies, based at least in part on a first look-up table, a respective second beam index associated with a respective second beam group of the second set of beam groups, wherein the second look-up table contains a second plurality of bit-points, and wherein each bit point, of the second plurality of bit points, is associated with a different identification result of a respective beam index associated with a respective beam group of the second set of beam groups.

In a nineteenth aspect, alone or in combination with one or more of the first through eighteenth aspects, the quantity of bit points, included in the first plurality of bit points, is based at least in part on a combination number of grouping the set of beams into the first set of beam groups, wherein a quantity of bits for reporting the first bit point is based at least on a ceiling of a logarithmic, based by 2, of the quantity of bit points included in the first plurality of bit points, wherein a quantity of bit points, included in the second plurality of bit points, is based at least in part on a combination number of grouping the set of beams into the second set of beam groups, and wherein a quantity of bits for reporting the second bit point is based at least on a ceiling of a logarithmic, based by 2, of the quantity of bit points included in the second plurality of bit points. In a twentieth aspect, alone or in combination with one or more of the first through nineteenth aspects, when identifying the respective one or more transfer domain bases, the BS may be configured to identify a first transfer domain basis, of the plurality of transfer domain bases, for the first set of beam groups based at least in part on the first transfer domain basis being associated with the first layer, and identify a second transfer domain basis, of the plurality of transfer domain bases, for the second set of beam groups based at least in part on the second transfer domain basis being associated with the second layer.

In a twenty-first aspect, alone or in combination with one or more of the first through twentieth aspects, a first subset of one or more transfer domain bases, for a first beam group of the one or more beam groups, includes a same quantity of transfer domain bases as a second subset of one or more transfer domain bases for a second beam group of the one or more beam groups, and wherein the transfer domain basis selection information comprises a first plurality of bits that identify the first subset of the one or more transfer domain bases for the first beam group, and a second plurality of bits that identify the second subset of the one or more transfer domain bases for the second beam group, wherein the first plurality of bits and the second plurality of bits are a same quantity of bits.

In a twenty-second aspect, alone or in combination with one or more of the first through twenty-first aspects, a first subset of one or more transfer domain bases, for a first beam group of the one or more beam groups, includes a different quantity of transfer domain bases relative to a second subset of one or more transfer domain bases for a second beam group of the one or more beam groups, wherein the transfer domain basis selection information comprises a first plurality of bits that identify the first subset of the one or more transfer domain bases for the first beam group, and a second plurality of bits that identify the second subset of the one or more transfer domain bases for the second beam group, wherein the first plurality of bits and the second plurality of bits are a different quantity of bits. In a twenty-third aspect, alone or in combination with one or more of the first through twenty-second aspects, the respective one or more transfer domain bases is included in a plurality of transfer domain bases, wherein the plurality of transfer domain bases comprises an oversampled transfer domain bases set, and wherein the respective one or more transfer domain bases is selected from the oversampled transfer domain bases set, wherein a quantity of transfer domain bases, included in the respective one or more transfer domain bases, is based at least in part on an oversampling rate associated with the oversampled transfer domain bases set.

In a twenty-fourth aspect, alone or in combination with one or more of the first through twenty-third aspects, the respective one or more transfer domain bases comprises respective combination of non-oversampled transfer domain bases subsets identified in an oversampled transfer domain bases set. In a twenty-fifth aspect, alone or in combination with one or more of the first through twenty-fourth aspects, the transfer domain basis selection information comprises a bit point identifying, based at least in part on a look-up table, the respective combination of non-oversampled transfer domain bases subsets, for each beam group of the one or more beam groups, by a bit point, wherein the look-up table includes a plurality of bit points, and wherein each respective bit point, of the plurality of bit points, is associated with a particular combination of selections of non-oversampled transfer domain bases subsets, wherein a quantity of bit points, included in the plurality of bit points, is based at least in part on an exponential function comprising a base being a quantity of beam groups included in the one or more beam groups, and an argument being an oversampling rate associated with an oversampled transfer domain bases set, and wherein a quantity of bits for reporting the bit point is based at least in part on a ceiling of a logarithmic function, based by 2, of the quantity of bit points in the plurality of bits points.

In a twenty-sixth aspect, alone or in combination with one or more of the first through twenty-fifth aspects, the transfer domain basis selection information comprises information identifying a respective transfer domain bases subset index, associated with the respective combination of non-over-sampled transfer domain bases subsets for each beam group of the one or more beam groups. In a twenty-seventh aspect, alone or in combination with one or more of the first through twenty-sixth aspects, the respective one or more transfer domain bases is included in a plurality of transfer domain bases, and wherein the plurality of transfer domain bases is included in a non-oversampled transfer domain bases set, wherein a quantity of bits, for reporting each transfer domain bases subset index, is based at least in part on a ceiling of a logarithmic function, based by 2, of the oversampling rate associated with the oversampled transfer domain bases set, and wherein a quantity of subsets is based at least on a quantity of the one or more beam groups.

In a twenty-eighth aspect, alone or in combination with one or more of the first through twenty-seventh aspects, when determining the beam group identification information and the transfer domain basis selection information the BS may perform a lookup in a look-up table based at least in part on one or more bit points identified by the plurality of values of the plurality of bits included in the CSI feedback communication. In a twenty-ninth aspect, alone or in combination with one or more of the first through twenty-eighth aspects, when determining the beam group identification information and the transfer domain basis selection information, the BS may determine the beam group identification information and the transfer domain basis selection information based at least in part on a bit map identified by the plurality of values of the plurality of bits included in the CSI feedback communication. In a thirtieth aspect, alone or in combination with one or more of the first through twenty-ninth aspects, the plurality of values of the plurality of bits explicitly identify the beam group identification information and the transfer domain basis selection information.

In a thirty-first aspect, alone or in combination with one or more of the first through thirtieth aspects, the transfer domain basis selection information comprises for all beam groups of the one or more beam groups, a multi-bit combinatorial indicator that identifies a combination of subsets of transfer domain bases, of the respective one or more transfer domain bases for each beam group of the one or more beam groups, wherein each subset of transfer domain bases, included in the combination of subsets, is associated with a particular beam group of the one or more beam groups.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    identifying, based at least in part on a codebook, a set of beams to feedback in a channel state information (CSI) feedback communication;
    identifying a plurality of beam groups associated with the set of beams;
    selecting respective one or more transfer domain bases, from a plurality of transfer domain bases, for each beam group of the plurality of beam groups;
    determining a plurality of values, for a plurality of bits, that represent:
        beam group identification information identifying a quantity of the plurality of beam groups, and
        transfer domain basis selection information associated with the respective one or more transfer domain bases for each beam group of the plurality of beam groups, wherein the transfer domain basis selection information comprises, for a particular beam group of the plurality of beam groups, information identifying a quantity of one or more transfer domain bases for the particular beam group; and transmitting, to a base station (BS), the plurality of bits in the CSI feedback communication.

2. The method of claim 1, wherein the plurality of transfer domain bases is based at least in part on at least one of:
 a plurality of discreet Fourier transform (DFT) bases, or
 a plurality of discreet cosine transform (DCT) bases.

3. The method of claim 1,
 wherein the plurality of bits comprises:
  a subset of bits to explicitly indicate the quantity of the plurality of beam groups,
   wherein a quantity of the subset of bits to explicitly indicate the quantity of the plurality of beam groups is based at least in part on a ceiling of a logarithmic function, based by 2, of a quantity of beams included in the set of beams.

4. The method of claim 1, wherein a quantity of the plurality of beam groups is configured via a radio resource communication (RRC) or indicated via a downlink control information (DCI) communication.

5. The method of claim 1,
 wherein the plurality of bits comprises:
  a subset of bits to explicitly indicate the quantity of the one or more transfer domain bases for the particular beam group,
   wherein a quantity of the subset of bits to explicitly indicate the quantity of the one or more transfer domain bases for the particular beam group is based at least in part on a ceiling of a logarithmic function, based by 2, of a quantity of transfer domain bases in the plurality of transfer domain bases.

6. The method of claim 1, wherein a quantity of the respective one or more transfer domain bases is configured via a radio resource (RRC) communication or indicated via a downlink control information (DCI) communication.

7. The method of claim 1, wherein the transfer domain basis selection information comprises:
 a bit point, for a particular beam group of the plurality of beam groups, that is associated with a combination of transfer domain bases of one or more transfer domain bases for the particular beam group.

8. The method of claim 7, wherein the bit point, associated with the combination of transfer domain bases is identified in a look-up table,
 wherein the look-up table identifies a plurality of bit points that identifies respective combinations of transfer domain bases of the plurality of transfer domain bases,
  wherein a quantity of bit points, included the plurality of bit points, is based at least on a combination of numbers for selecting the one or more transfer domain bases for the particular beam group from a quantity of transfer domain bases included the plurality of transfer domain bases, and
  wherein a quantity of bits for reporting the bit point is based at least in part on, a ceiling of a logarithmic function, based by 2, of a quantity of bit points included the plurality of bit points included in the look-up table.

9. The method of claim 1, wherein the transfer domain basis selection information comprises:
 for all beam groups of the plurality of beam groups, a multi-bit combinatorial indicator that identifies a combination of subsets of transfer domain bases, of the respective one or more transfer domain bases for each beam group of the plurality of beam groups,
  wherein each subset of transfer domain bases, included in the combination of subsets, is associated with a particular beam group of the plurality of beam groups.

10. The method of claim 1, wherein the transfer domain basis selection information comprises:
 a bit map, for a particular beam group of the plurality of beam groups, that identifies one or more transfer domain bases for the particular beam group,
  wherein each bit, included in the bit map, indicates whether a respective transfer domain basis, of the plurality of transfer domain bases, is included in the one or more transfer domain bases for the particular beam group, and
  wherein a quantity of bits for reporting the bit map is based at least in part on a quantity of transfer domain bases included in the plurality of transfer domain bases.

11. The method of claim 1, wherein the transfer domain basis selection information comprises:
 information identifying a quantity of transfer domain bases included in one or more transfer domain bases for a particular beam group of the plurality of beam groups; and
 a plurality of bits that explicitly indicate a transfer domain basis index for each respective transfer domain basis included in the one or more transfer domain bases.

12. The method of claim 1, wherein the plurality of transfer domain bases comprises:
 an oversampled transfer domain bases set; and
 wherein selecting the respective one or more transfer domain bases comprises:
  selecting the respective one or more transfer domain bases from the oversampled transfer domain bases set,
   wherein a quantity of transfer domain bases, included in the respective one or more transfer domain bases is based at least in part on an oversampling rate associated with the oversampled transfer domain bases set.

13. A user equipment (UE) for wireless communication, comprising:
 one or more memories; and
 one or more processors coupled to the one or more memories, the memory and the one or more processors configured to:
  identify, based at least in part on a codebook, a set of beams to feedback in a channel state information (CSI) feedback communication;
  identify a plurality of beam groups associated with the set of beams;
  select respective one or more transfer domain bases, from a plurality of transfer domain bases, for each beam group of the plurality of beam groups;
  determine a plurality of values, for a plurality of bits, that represent:
   beam group identification information identifying a quantity of the plurality of beam groups, and
   transfer domain basis selection information associated with the respective one or more transfer domain bases for each beam group of the plurality of beam groups, wherein the transfer domain basis selection information comprises, for a particular beam group of the plurality of beam groups, information identifying a quantity of one or more transfer domain bases for the particular beam group; and transmit, to a base station (BS), the plurality of bits in the CSI feedback communication.

14. The UE of claim 13, wherein the transfer domain basis selection information comprises:

for all beam groups of the plurality of beam groups, a multi-bit combinatorial indicator that identifies a combination of subsets of transfer domain bases, of the respective one or more transfer domain bases for each beam group of the plurality of beam groups, wherein each subset of transfer domain bases, included in the combination of subsets, is associated with a particular beam group of the plurality of beam groups.

15. The UE of claim 13, wherein the plurality of bits comprises:

a subset of bits to explicitly indicate the quantity of the plurality of beam groups, wherein a quantity of the subset of bits to explicitly indicate the quantity of the plurality of beam groups is based at least in part on a ceiling of a logarithmic function, based by 2, of a quantity of beams included in the set of beams.

16. A method of wireless communication performed by a base station (BS), comprising:

receiving, from a user equipment (UE), a channel state information (CSI) feedback communication;

determining, based at least in part on a set of beams identified in the CSI feedback communication, and a plurality of values for a plurality of bits included in the CSI feedback communication:

beam group identification information identifying a quantity of a plurality of beam groups, and transfer domain basis selection information associated with respective one or more transfer domain bases for each beam group of the plurality of beam groups, wherein the transfer domain basis selection information comprises, for a particular beam group of the plurality of beam groups, information identifying a quantity of one or more transfer domain bases for the particular beam group; and performing downlink communications, based at least in part on the set of beams, beam group identification information, and the transfer domain basis selection information.

17. The method of claim 16, wherein the respective one or more transfer domain bases are included in a plurality of transfer domain bases; and wherein the plurality of transfer domain bases is based at least in part on at least one of:

a plurality of discreet Fourier transform (DFT) bases, or a plurality of discreet cosine transform (DCT) bases.

18. The method of claim 16, wherein the plurality of bits comprises:

a subset of bits to explicitly indicate the quantity of the plurality of beam groups, wherein a quantity of bits, included in the subset of bits to explicitly indicate the quantity of the plurality of beam groups, is based at least in part on a ceiling of a logarithmic function, based by 2, of a quantity of beams included in the set of beams.

19. The method of claim 16, wherein a quantity of the plurality of beam groups is configured via a radio resource communication (RRC) or indicated via a downlink control information (DCI) communication.

20. The method of claim 16, wherein the plurality of bits comprises:

a subset of bits to explicitly indicate the quantity of the one or more transfer domain bases for the particular beam group, wherein a quantity of bits, included in the subset of bits to explicitly indicate the quantity of the one or more transfer domain bases for the particular beam group, is based at least in part on a ceiling of a logarithmic function, based by 2, of a quantity of transfer domain bases in the one or more transfer domain bases.

21. The method of claim 16, wherein a quantity of the respective one or more transfer domain bases is configured via a radio resource communication (RRC) or indicated via a downlink control information (DCI) communication.

22. The method of claim 16, wherein the transfer domain basis selection information comprises:

a bit point, for a particular beam group of the plurality of beam groups, that is associated with a combination of transfer domain bases of one or more transfer domain bases for the particular beam group.

23. The method of claim 22, wherein the bit point, associated with the combination of transfer domain bases is identified in a look-up table, wherein the look-up table identifies a plurality of bit points that identifies respective combinations of transfer domain bases of a plurality of transfer domain bases, wherein a quantity of bit points, included in the plurality of bit points, is based at least in part on a combination number for selecting the one or more transfer domain bases for the particular beam group based at least in part on a quantity of transfer domain bases in the plurality of transfer domain bases, and wherein a quantity of bits, for reporting the bit point, is based at least in part on a ceiling of a logarithmic function, based by 2, of the quantity of bit points, included in the plurality of bit points, included in the look-up table.

24. The method of claim 23, further comprising:

identifying respective transfer domain basis indexes of the respective one or more transfer domain bases using a table that identifies transfer domain basis indexes of transfer domain bases based at least in part on a value of an indicator of a CSI report.

25. The method of claim 24, further comprising:

identifying, in a row or column corresponding to an order of the one or more transfer domain bases with a greatest index in the table, a first greatest value that is less than or equal to the value of the indicator;

determining an index of a transfer domain basis with the greatest index based at least in part on the column or row index of the first greatest value, updating the value of the indicator by subtracting the first greatest value from the indicator;

identifying, in the row or column corresponding to the order of the one or more transfer domain bases with a second greatest index in the table, a second greatest value that is less than or equal to the value of the indicator;

determining an index of a beam with the second greatest index based at least on part on the row or column index of the second greatest value; and updating the value of the indicator by subtracting the second greatest value from the indicator to identify indexes of remaining transfer domain basis with smaller indexes.

26. The method of claim 16, wherein the transfer domain basis selection information comprises:
for all beam groups of the plurality of beam groups, a bit point that identifies a combination of subsets of transfer domain bases, of the respective one or more transfer domain bases for each beam group of the plurality of beam groups,
wherein each subset of transfer domain bases, included in the combination of subsets, is associated with a particular beam group of the plurality of beam groups.

27. The method of claim 26, wherein the bit point that identifies the combination of subsets of transfer domain bases is identified in a look-up table; and
wherein the look-up table identifies a plurality of bit-points associated with a plurality of combinations of subsets of a plurality of transfer domain bases,
wherein a quantity of bit points, included in the plurality of bit-points, is based at least in part on a multiplication of combination numbers for selecting the respective one or more transfer domain bases for each beam group of the plurality of beam groups, from a quantity of transfer domain bases included in the plurality of transfer domain bases, and
wherein a quantity of bits for reporting the bit point is based at least in part on a ceiling of a logarithmic function, based by 2, of a quantity of the combinations of the subsets of transfer domain bases.

28. The method of claim 16, wherein the transfer domain basis selection information comprises:
for all beam groups of the plurality of beam groups, a multi-bit combinatorial indicator that identifies a combination of subsets of transfer domain bases, of the respective one or more transfer domain bases for each beam group of the plurality of beam groups,
wherein each subset of transfer domain bases, included in the combination of subsets, is associated with a particular beam group of the plurality of beam groups.

29. A base station (BS) for wireless communication, comprising:
one or more memories; and
one or more processors coupled to the one or more memories, the memory and the one or more processors configured to:
receive, from a user equipment (UE), a channel state information (CSI) feedback communication;
determine, based at least in part on a set of beams identified in the CSI feedback communication, and a plurality of values for a plurality of bits included in the CSI feedback communication:
beam group identification information identifying a quantity of a plurality of beam groups, and
transfer domain basis selection information associated with respective one or more transfer domain bases for each beam group of the plurality of beam groups, wherein the transfer domain basis selection information comprises, for a particular beam group of the plurality of beam groups, information identifying a quantity of one or more transfer domain bases for the particular beam group, information identifying a quantity of one or more transfer domain bases for the particular beam group; and
perform downlink communications, based at least in part on the set of beams, the beam group identification information, and the transfer domain basis selection information.

30. The BS of claim 29, wherein the transfer domain basis selection information comprises:
for all beam groups of the plurality of beam groups, a multi-bit combinatorial indicator that identifies a combination of subsets of transfer domain bases, of the respective one or more transfer domain bases for each beam group of the plurality of beam groups,
wherein each subset of transfer domain bases, included in the combination of subsets, is associated with a particular beam group of the plurality of beam groups.

* * * * *